United States Patent
Abou-Assali Rodríguez et al.

(10) Patent No.: US 11,383,465 B2
(45) Date of Patent: Jul. 12, 2022

(54) MACHINE FOR ADAPTING A FIBRE STRUCTURE TO A MOULD FOR MANUFACTURING PARTS OF COMPOSITE MATERIAL

(71) Applicants: UNIVERSIDAD POLITECNICA DE MADRID, Madrid (ES); AEON-T COMPOSITE TECHNOLOGIES, S.L., Madrid (ES)

(72) Inventors: Alejandro Abou-Assali Rodríguez, Madrid (ES); Enrique Chacón Tanarro, Madrid (ES); Juan Manuel Muñoz Gijosa, Madrid (ES); Rafael Escobar Orellana, Madrid (ES)

(73) Assignee: UNIVERSIDAD POLITÉCNICA DE MADRID, Madrid (ES)

( * ) Notice: Subject to any disclaimer, the term of this patent is extended or adjusted under 35 U.S.C. 154(b) by 0 days.

(21) Appl. No.: 17/283,750

(22) PCT Filed: Sep. 19, 2019

(86) PCT No.: PCT/ES2019/070618
§ 371 (c)(1),
(2) Date: Apr. 8, 2021

(87) PCT Pub. No.: WO2020/074757
PCT Pub. Date: Apr. 16, 2020

(65) Prior Publication Data
US 2021/0379845 A1     Dec. 9, 2021

(30) Foreign Application Priority Data

Oct. 10, 2018   (ES) .................................. P201830979

(51) Int. Cl.
*B29C 70/56*   (2006.01)
*B29C 70/54*   (2006.01)
(Continued)

(52) U.S. Cl.
CPC ............ *B29C 70/543* (2013.01); *B29C 70/38* (2013.01); *B29C 70/42* (2013.01); *B29C 70/541* (2013.01); *B29C 70/56* (2013.01)

(58) Field of Classification Search
CPC ..... B29C 70/56; B29C 70/541; B29C 51/262; B29C 70/543
See application file for complete search history.

(56) References Cited

U.S. PATENT DOCUMENTS

2006/0148126 A1*   7/2006   Murakami .......... H01L 21/4857
                                                          438/106
2013/0101694 A1*   4/2013   Theinert ................. B29B 11/16
                                                          425/383
(Continued)

FOREIGN PATENT DOCUMENTS

DE    102011012500 A1    8/2012
DE    102012021738 A1    4/2014
(Continued)

OTHER PUBLICATIONS

A. Perez Igualador, PCT International Search Report for PCT/ES2019/070618, English Translation, dated Apr. 12, 2019.
(Continued)

*Primary Examiner* — Scott W Dodds
(74) *Attorney, Agent, or Firm* — Jayne Marie Saydah

(57) ABSTRACT

The machine comprises a solid matrix (1), a deformable body (2) joined to the surface of said matrix (1), a shaping mould (3) and a securing system system (5) for the fibre structure (4). The matrix (1) is a solid element having a functional face, the geometry of which depends on the part to be manufactured. The deformable body (2) has an initial geometry that depends on the geometry to be given to the fibre structure (4). The shaping mould (3) has the geometry to be given to the fibre structure (4) during the process of adaptation to the shaping mould (3), and the shaping mould
(Continued)

(3) is located such that the deformable body (2) is located between said shaping mould (3) and the matrix (1).

15 Claims, 24 Drawing Sheets

(51) Int. Cl.
*B29C 70/38* (2006.01)
*B29C 70/42* (2006.01)

(56) References Cited

U.S. PATENT DOCUMENTS

2014/0103571 A1    4/2014  Karbo et al.
2018/0370072 A1*  12/2018  Pfaff .................. B28B 23/04

FOREIGN PATENT DOCUMENTS

DE    102013007382 A1   10/2014
EP         2419260 A1    2/2012
ES         2648562 T3    4/2018
WO        201514411 A1    1/2015

OTHER PUBLICATIONS

English Translation of the Written Opinion of the International Searching Authority for PCT/ES2019/070618.

\* cited by examiner

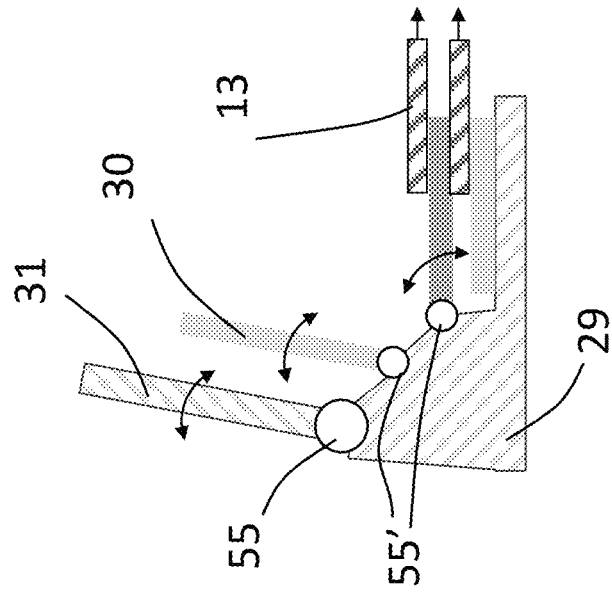
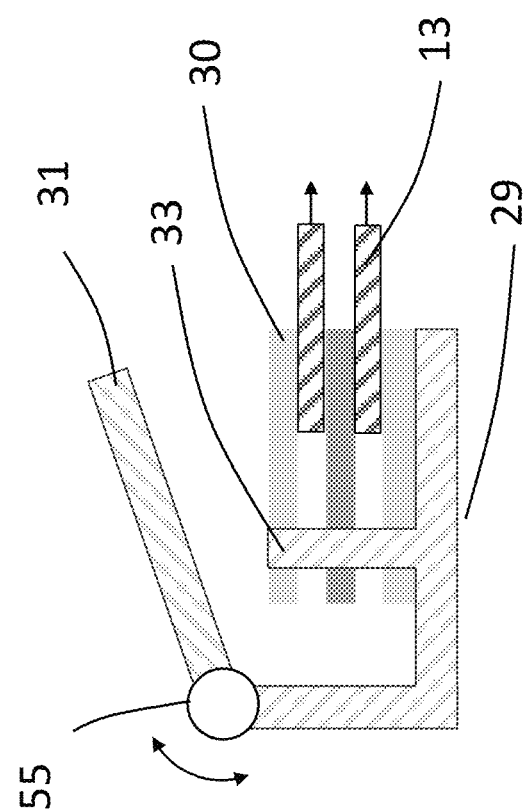
Fig. 24.A
Fig. 24.B

MACHINE FOR ADAPTING A FIBRE STRUCTURE TO A MOULD FOR MANUFACTURING PARTS OF COMPOSITE MATERIAL

CROSS-REFERENCE

This application is the U.S. National Stage of International Application No. PCT/ES2019/070618 filed on Sep. 19, 2019, which claims the benefit of priority from Spanish Patent application No. P201830979 filed on Oct. 10, 2018, the contents of which are both herein incorporated by reference in their entirety.

BACKGROUND OF THE INVENTION

Field of the Invention

The present invention relates to a system for adapting a fibre structure (carbon, aramid or glass are the most used at an industrial level) to a three-dimensional mould, obtaining a fibre preform for manufacturing composite parts.

The technical field is manufacturing processes for composite parts, manufacturing engineering.

Description of Related Art

The automated and high productivity production of composite parts starts from a flat structure of fibres (for example, carbon, aramid or glass fibre are the most used) aligned according to the main load directions. Said fibres can be in the form of a fabric or arranged according to a single direction (unidirectional). After stacking as many layers as necessary, the fibres are adapted to the shape of the part to be manufactured, a process that is called preforming. The preform obtained is then subjected to a resin infiltration process, in the event that the fibres are not previously impregnated with resin, and then the part is cured by applying pressure and temperature.

Among the wide variety of existing preforming processes, the most common in the industry is compression preforming due to the high degree of automation and productivity thereof, wherein the fibres are tensioned and introduced between two preforming moulds, male and female, between which they are compressed by means of a press.

During compression preforming the fibres are prone to defects such as wrinkles, alignment according to unwanted directions, deformation of the fabric strands, formation of loops, all of them due to the stress in the fibres during the process, to the friction with the mould and the degree of complexity of the part to be manufactured. These defects are especially serious if the fibres are previously impregnated with resin, known as prepregs, in which case the phenomena of adhesion between layers and between fibres and mould are very pronounced, preventing a correct sliding between layers and increasing the mentioned defects. The mechanical resistance of a composite part that has said defects in the alignment of the fibres is compromised in the areas wherein this phenomenon occurs, forcing designers to reinforce the part with a greater quantity of fibres, which increases the production cost of said part.

The defects in the direction of the fibres are highly dependent on the complexity of the part to be manufactured, tending to be reduced the simpler and flatter the part is. In other words, said defects force the designers to subdivide complex parts into simpler units that can be manufactured. This increase in the number of parts is accompanied by a considerable increase in production cost, since each one of the sub-elements requires the respective manufacturing line thereof. For this reason, it is of great industrial interest to develop processes for adapting fibres that enable the aforementioned defects with parts of complex geometry to be avoided. The present invention discloses a solution to this problem.

BRIEF SUMMARY OF THE INVENTION

The present invention describes a machine for adapting a fibre structure to a mould, a process also known in the industry as preforming, for manufacturing parts of composite material, which considerably reduces the friction that acts on the fibres during the process, even enabling the adaptation of resin prepreg fibres to complex moulds, for which current compression preforming processes are not suitable due to the appearance of defects in the direction of the fibres.

Unlike current compression preforming processes, wherein the fabric is forced to acquire the shape of the part by being compressed between two rigid moulds, in the present invention the fabric (fibre structure) is introduced between a rigid shaping mould and an easily deformable body that has an initial shape that is not detailed and that depends on the geometry of the part to be manufactured. By means of the controlled deformation of said deformable body on the fibre structure and the mould, the fibres are progressively compressed against said mould, adapting thereto with a very low stress level, thus avoiding a large number of defects in the alignment of the fibres that are produced as a result of said stresses.

The controlled deformation of the deformable body is achieved by means of two methods: either by providing movement to a matrix, or by means of an elastic deformable body with inner cavities that are filled with a fluid, causing controlled increases in volume. It is important to note that the combination of the two methods is envisaged.

The machine comprises at least the following elements: a matrix, a deformable body, a shaping mould and a securing system for the fibres.

The matrix is a solid element similar to a mould, and has a geometry that is not detailed, and that depends on the shape to be given to the fibre structure. The function thereof is to support the deformable body that is joined to said matrix on one of the faces thereof.

The shaping mould, which has the shape to be given to the fibre structure, is positioned so that the deformable body is located between the matrix and said mould.

The fibre structure is made up of at least one layer of fibres, which can be of any configuration, such as a unidirectional or woven arrangement, and the orientations of which are those required for the part in question depending on the load conditions thereof. The fibres may be previously impregnated with resin, a material known as "prepreg", or they may be devoid of it, being called "dry fibres".

If the process for adapting the fibres so requires, the layers can be joined together entirely or in specific areas thereof, by applying adhesives or by being sewn. The objective of this joining is to transmit the stress generated by a securing element of the securing system to the layers that so require it. In the case of fibres already impregnated with resin, it is possible to use the adherence of the resin itself to join two consecutive layers, applying pressure in specific areas or simply by means of the effect of gravity. Thanks to the latter, the required machinery is simplified, as the need to implement additional processes such as sewing or adding adhesives is eliminated. Moreover, it is possible to eliminate the expensive resin injection systems associated with the use of dry preforms, which are also prone to producing defects in the part such as resin deposits, bubbles, porosities or delamination in the advance front of the resin.

The machine for adapting a fibre structure object of the present invention enables the size of the fibre layers to be optimised, some of them not being able to cover the entire area of the fibre structure corresponding to the complete preform. In this way, the amount of fibre used is reduced, thereby reducing the cost associated with each part and enabling certain areas of said part to be reinforced with a greater number of layers arranged according to the necessary orientation. In this regard, there are similarities with invention WO 2015144411, which shows a fibre stacking process wherein it is not necessary for each layer to cover the entire area of the preform either, also reducing the amount of fibres necessary by optimising the size and the position of the layers. However, in said procedure the layers are stacked and joined to a substrate that is responsible for transmitting the stress to the fibres. Said substrate does not exist in the present invention, i.e., the layers can be joined together or simply stacked without executing any joining between them.

The securing system, according to claim 1, has the function of securing the fibre structure, enabling said fibre structure to be positioned in the preforming station and at the same time providing the same with the necessary stress during the process of adaptation, enabling each layer to slide relative to each other when they require it. The securing system is formed by at least one securing element comprising: a lower frame, separation sheets, an upper frame, a coupling system between the lower frame, sheets and upper frame, and a closure system.

The lower frame and the upper or closure frame are the structural elements of the securing system between which the fibres are secured, and they can be made of any material, steel sheet, aluminium, plastics, etc., and are those in charge of applying pressure on the fibre structure that is placed between them by way of a "sandwich". It is envisaged that these elements have anchors or joining elements that are necessary for the handling, transfer or storage thereof that are not detailed.

The separation sheets are the only elements that are in contact with the fibre structure and cover an area greater than or equal to the effective securing area, i.e., the area of the fibre structure that is covered by the fibre securing system at the initial moment of the process of adaptation. According to claim 17, said sheets can be made of any flexible material, preferably plastics, and are coated with a non-stick medium, such as Teflon or certain silicones, to enable the sliding of several layers of the fibre structure. Alternatively, they can be made entirely of said non-stick material.

To ensure a homogeneous distribution of pressure on the fibre structure, according to claim 16, the placement of an elastic element is envisaged, of the thickness that is necessary, such as flexible PVC foam, on the surface of both frames, specifically on the face adjacent to the separation sheets, covering an area greater than or equal to the effective securing area. It is also envisaged that the various layers of the fibre structure may protrude from the securing element in areas that require it, for example, because the geometry of the shaping mould to which the fibre structure is to be adapted requires a considerable amount of the fibres.

The coupling system is necessary to avoid relative slipping between the lower and upper frames and the sheets according to the plane thereof, and to enable the securing effect, and it can be any geometric coupling system, such as pins or hinge mechanisms that link said elements. Mixed solutions consisting of pins and hinge mechanisms are also envisaged, such as, for example, pins that join the lower frame and the sheets, and a hinge mechanism that joins the upper and lower frames. It is also possible to connect the upper frame and the sheets to the lower frame by means of hinge mechanisms.

A specific solution of the coupling system based on pins, is the one indicated in claim 20, which comprises a cylindrical pin solidly joined with the lower frame and that passes through the sheets and the upper frame through made-to-measure holes, the displacement being according to the normal to the plane of the elements as the only relative degree of freedom.

The closure system applies a regulated force between the upper frame and the lower frame, with which the layers of the fibre structure are compressed, and prevents said elements from unlocking. Said closure system can be any mechanical, magnetic or electromechanical element such as clamps, magnets, pneumatic or hydraulic cylinders, servomotors or any other existing system, which enables the closure force to be regulated and prevent the elements of the securing system from accidentally disassembling.

An example of a closure system is the element that is fastened to the cylinder by means of a mechanical joint, and that has a spring, which is not detailed, in the portion wherein it contacts the upper frame. Said system is not detailed as it would not provide novelty or inventive activity given the wide variety of solutions available on the market.

Another example of a closure system, in the event that the coupling system between the upper frame and the lower frame is made up of hinges, is a rotary actuator integrated in said hinge that moves said frames according to the degree of freedom of rotation thereof by way of a "clamp".

It should be noted that the tools or securing anchors that each securing element may have in the corresponding lower frame and/or upper frame thereof serve to store, transport, or manipulate, preferably by means of a robotic system, and with the help of a tool that it is not detailed, all the securing elements at the same time, which together form the entire fibre securing system.

It is important to highlight that the fibre securing system that is presented as part of this invention is characterised by directly securing the fibres that are going to form part of the preform, in contrast to the aforementioned WO 2015144411 invention, in the system of which only a substrate is secured on which the different layers of fibres are adhered.

Said securing system is further characterised by fully or partially encompassing the contour of the fibre structure.

It should be noted that the features of the securing system enable it to be stored together with the fibre structure in an intermediate production step if so required.

The operation of the present invention consists of adapting the fibre structure by means of the progressive and controlled deformation of the deformable body against said fibre structure and the mould, forcing said fibre structure to adopt the shape of said mould. Thanks to the progressiveness in the adaptation, it is possible to greatly reduce the stress between layers compared to current compression preforming processes, enabling a relative sliding between them thanks to the fibre securing system, since the blockage produced when the fibres come into contact with the mould before reaching the correct position thereof in it is avoided, thus eliminating the failures in the alignment of the fibres that said effect generated. The improvement is even more remarkable in the case of prepreg fibres, in which the aforementioned blocking effect is of such magnitude in current processes that it prevents even the shaping of simple geometries.

In the preferred embodiment of the invention, and according to claim 1, to achieve progressive and controlled deformation of the deformable body, the matrix has the ability to move towards the mould, preferably by means of a press, compressing said deformable body against the fibre structure and forcing the latter to adopt the shape of said mould.

Said matrix can be formed by one or more elements that move according to a mechanism that can be formed by various elements such as joints, linear guides, springs, and which is actuated by at least one actuator, preferably a hydraulic cylinder. The objective of said mechanism is to provide a certain movement to each element of the matrix that exerts pressure on the deformable body, giving the system greater control over the trajectory of the deformable body and, therefore, over the adaptation of the fibre structure. In one exemplary embodiment of the invention, the mechanism is actuated solely by a hydraulic cylinder and has joints and a spring that restrict the movement of the elements of the matrix. Said elements can also have independent movements and be displaced by means of the hydraulic cylinders.

It is important to note that a combination of solutions is also envisaged, some of the elements of the matrix being able to have an independent actuation system thereof, and the rest of the elements being joined by means of a mechanism.

In the preferred embodiment of the invention, the deformable body is a low-resistance material, such as wet clay, which is easily deformed by means of plastic deformation or yield processes, that is, once deformed and after the pressure ceases, the deformable body does not recover the initial shape thereof, as stated in claim 2. The sequence of plastic deformation of materials of this type and that is claimed in this embodiment of the invention is of vital importance when adapting the fibres without causing misalignment in them, enabling a greater degree of control of the adaptation.

Said initial shape, which is not detailed as it depends on the shape of the part to be adapted, is of great importance for the process.

In this case, the machine additionally requires a system for restoring the initial geometry of said deformable body, so that it is possible to repeat the process cyclically and is suitable for series production. Otherwise the invention would be of no interest to industrial production. Said restoration system comprises an additional mould that has the initial shape to be given to the deformable body, and which is pushed and pressed against the matrix by means of a press, said deformable body remaining between these last elements, being therefore forced to fill the existing cavity between matrix and said additional restoration mould. In order for the deformable body to be attached to the matrix, and not to the additional restoration mould, once the shaping of said deformable body has been completed, the use of different surface textures in the additional restoration mould and matrix is envisaged, so that the adherence of the deformable body to said matrix is greater than the adherence between said deformable body and said additional restoration mould, as described in claim 8. By means of the additional mould, the deformable body is forced to acquire the initial shape thereof so that it can be reused to adapt a new fibre structure.

Another strategy that is envisaged, and that is reflected in claim 9, is the introduction of an elastic film between the deformable body and said additional restoration mould. Said elastic film can be solidly joined to said additional restoration mould or be introduced between it and said deformable body independently by means of a securing element.

In a first embodiment of the invention, the film fastening system is solidly joined to the additional restoration mould; in a second embodiment of the invention, the film fastening system is solidly joined to the matrix; and in a third embodiment of the invention the film fastening system is an independent system configured to move relatively with respect to the additional mould and with respect to the matrix.

To control the volume of the deformable body during the restoration of the geometry thereof and to prevent the material from overflowing, an elastic gasket capable of undergoing large deformations is used; wherein said elastic gasket is located on the contour of the restoration mould, so that by compressing the matrix against said mould, the gasket prevents the material from leaving the moulding area, which would modify the volume of deformable material available for the next adaptation, preventing the correct automated operation of the invention. Said elastic gasket can contain local or global reinforcements or have different cross sections.

The elastic gasket is deformable and can be located on the restoration mould, as described in claim 13, or be linked to the matrix as described in claim 14, in which case said elastic gasket has a skirt towards the interior of the matrix that is in contact with the deformable material and that serves as an additional barrier to prevent the material from leaving the volume contained between the restoration mould and the matrix.

To achieve the evacuation of the air that is trapped between the matrix, the restoration mould and the deformable material, the film that separates the deformable material from the restoration mould has small perforations through which the air can flow but the deformable material cannot. Complementarily, the restoration mould has a porous surface or with holes connected to the outside, thus enabling the complete evacuation of air.

In the main embodiment of the invention, the fibre securing system must have, according to claim 2, an elastic film that separates the fibre structure from the deformable body during the adaptation, to avoid the contamination of said fibre structure. Said elastic film can be an element external to the fibre securing system, which is simply placed between the deformable body and the fibre structure during the adaptation; wherein said elastic film can be fastened to the matrix or to the shaping mould.

Said elastic film can also be solidly joined to the securing system by means of anchoring to the upper frame, the lower frame or both elements by means of a fastening system such as clamps. The film can also be placed between the mould and the fibre structure, in case the aforementioned elements need to be separated, as the fibre structure, if it is pre-impregnated, may have excessive adherence to the shaping mould that would hinder the extraction of said fibre structure once adapted.

In another embodiment of the invention, it is envisaged that the deformable body, according to claim 3, is a body that is elastically deformed without reaching plasticity or creep, such as an elastomer, recovering the original shape thereof when the pressure exerted by the matrix ceases, and inside of which there is a hollow structure of cavities or ducts connected or not connected to each other, porosities or any combination of the above, filled with a gas or a liquid. Said fluid is enclosed as there is no escape route. By means of a suitable design of the internal structure and the external shape thereof, it is possible to control the deformation trajectories that said deformable body will have when compressed due to the displacement of the matrix that is configured to move towards the mould.

In another embodiment of the invention, according to claim 4, to achieve the progressive and controlled deformation of the deformable body, said body is made of a material that is elastically deformed without reaching plasticity or creep, such as an elastomer, and inside of which there is a structure of cavities or ducts connected or not connected to each other, porosities or any combination of the above, filled with a gas or a liquid. Said fluid can enter or exit to the outside through at least one duct connected to an external pumping system, which can be located inside the matrix or directed directly outside from the deformable body. By injecting the fluid, the deformable body increases the volume thereof following a specific deformation trajectory according to the design thereof, thereby achieving the progressive adaptation of the fibre structure to the shaping mould.

It is also envisaged that the matrix is formed by one or more elements that move according to a mechanism that can be formed by various elements such as joints, linear guides, springs, and which is actuated by at least one actuator, preferably a hydraulic cylinder. The objective of the actuator is to provide a certain movement to each element of the matrix that exerts pressure on the deformable body, giving the system greater control over the trajectory of the deformable body and, therefore, over the adaptation of the fibre structure.

In one embodiment of the invention, said actuator is actuated solely by a hydraulic cylinder, and has joints and a spring that restrict the movement of the elements that make up the matrix. Said elements can also have independent movements and be displaced by means of the hydraulic cylinders.

It is important to note that a combination of several described solutions is also envisaged, some of the elements of the matrix being able to have an independent actuation system thereof, and the rest of the elements of the matrix being joined by means of a certain mechanism.

The fibre structure is located between the deformable body and the mould, and is formed by at least one layer of fibres, wherein the fibres and the layers of fibres can be joined together by means of adhesives or sewing processes, and which can contain inserts and core parts such as made of polymer foam, cork, wood or metal.

The parts that make up the matrix can be coupled by means of some type of intermediate mechanism such as joints, linear guides, springs, etc., or each one can have independent movement being actuated by the respective mechanical actuators thereof, such as a hydraulic cylinder.

In all the embodiments of the invention, it is envisaged that the fibre securing elements are secured by means of a system comprising: a flexible arm, a rigid support, and a movement mechanism.

The fibre securing element is secured to the flexible arm which is in turn anchored by the other end thereof to a mobile element of the movement mechanism. Said arm is flexible enough to bend under the action of the stress of the fibres, so that the securing element is aligned with said stress, reducing the risk of tearing the fibres at the end of the securing element.

To avoid deflection of the assembly formed by the fibres, the securing element and the flexible arm, the rigid support is placed under said flexible arm, wherein said support is anchored to the same mobile element of the movement mechanism as said flexible arm, i.e., one end of the flexible arm and the rigid support are solidly joined.

The movement mechanism has the function of moving the assembly of fibres according to the direction required by the process of adaptation, predominantly the vertical direction, i.e., the direction of movement of the matrix; wherein said movement mechanism can be actuated by an independent automated element, or by a pusher coupled to the matrix, so that the movements of the matrix and the mobile element of the movement mechanism are coupled.

BRIEF DESCRIPTION OF THE SEVERAL VIEWS OF THE DRAWINGS

FIGS. 24A and 24B show possible embodiments of the coupling system linked to the fibre securing system.

DETAILED DESCRIPTION OF THE INVENTION

Figure 1:
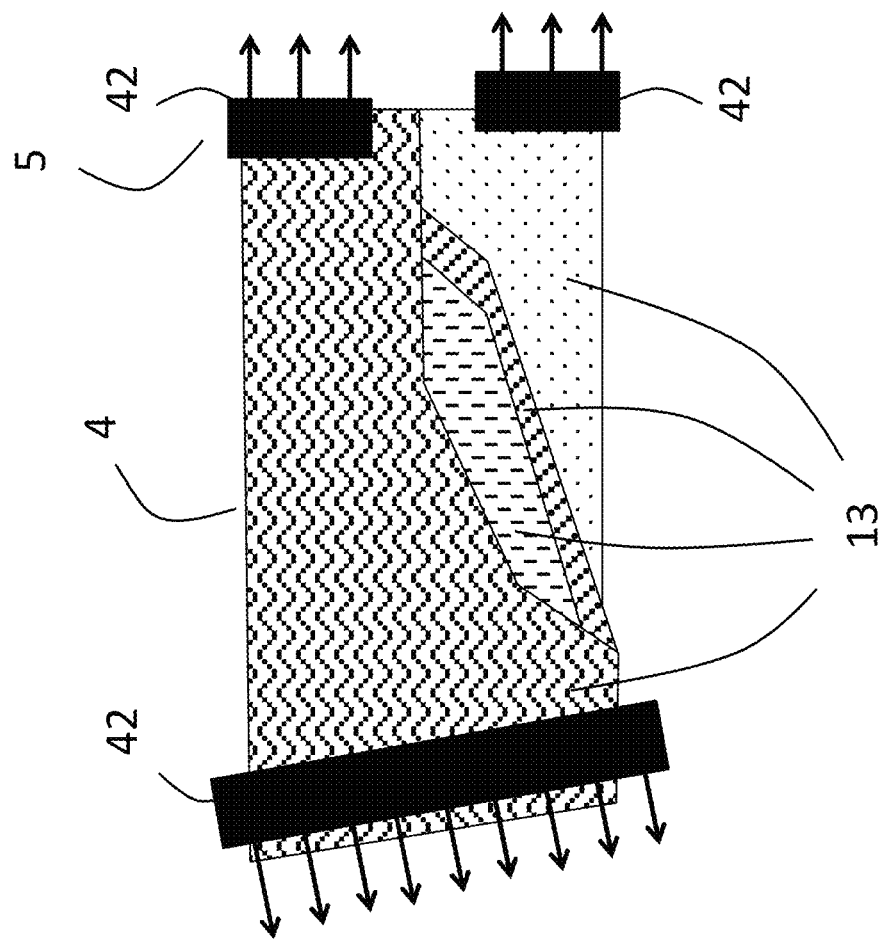
FIG. 1 shows a plan view of a fibre structure with the fibre securing system according to claim 1.

FIG. 1 shows a plan view of a fibre structure (4) according to claim 1 that will be subsequently shaped or adapted to the three-dimensional mould (3), and which is formed by a series of layers (13) of different geometry and oriented according to the load paths of the corresponding composite part. The layers (13) can be partially or entirely joined to each other by means of sewing or the use of adhesives. In the case of using fibres previously impregnated with resin, or prepregs, it is possible to use the adhesion generated by the resin itself to join said layers.

The objective of this joining is to transmit the stress generated by means of the fibre securing system (5) to the areas of the fibre structure (4) that require it, being able to otherwise not perform any joining between the layers (13). Said securing system (5), which is shown in detail in FIGS. 13-19, encompasses at least partially the contour of the fibre structure (4), and enables the fibres to slide where required, for example in areas where due to a more abrupt geometry, a greater quantity of fibres is needed. The fibre securing system (5) has anchoring points in each one of the elements (42) thereof that are not detailed, which enable, by means of a tool prepared for this purpose, all those elements (42) to be secured at the same time, preferably by means of a robot, to be transferred to the positions that are necessary, either in vacuum, or with the fibres (4) secured.

Figure 19:
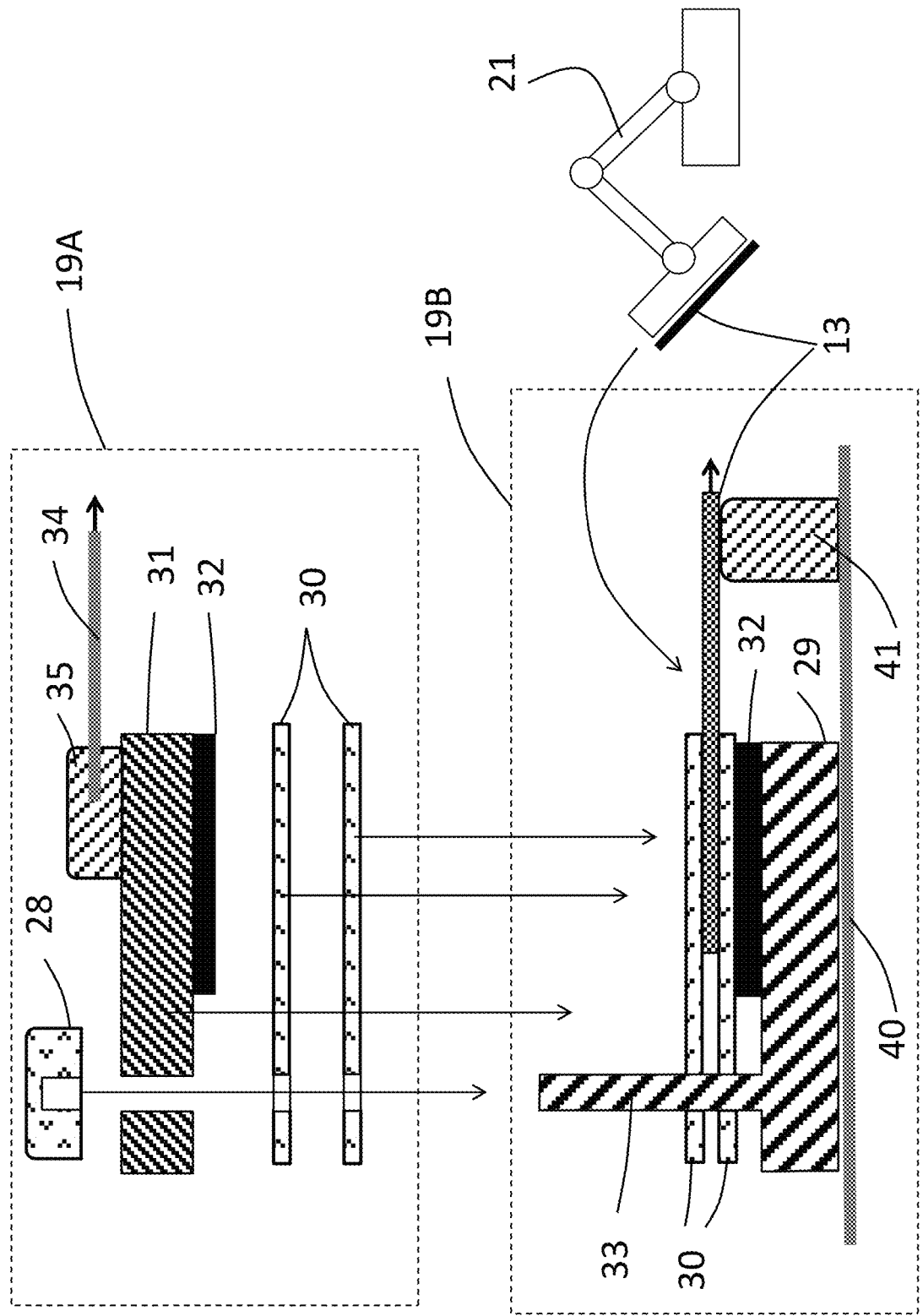
FIG. 19 shows a diagram of the automated assembly of the fibre securing system.

For example, to be transferred from the mounting area (19) of the securing system (5), which is detailed in FIG. 19, towards the adaptation area (20), specifically between the matrix (1) and the shaping mould (3).

Furthermore, the concept of securing system (5) that is presented, enables the intermediate storage of the same already mounted with the fibres (4), before being taken to the adaptation area (20), enabling the productive inequalities of the manufacturing phases to be absorbed.

It is important to note that the design of said securing system (5) mounted with the fibres (4) enables, after being installed between the matrix (1) and the shaping mould (3), each element (42) to have an independent movement during the adaptation of the fibres, thus being able to facilitate said adaptation in parts of complex geometry. This independent guide system is not detailed as it can be achieved by means of a wide variety of solutions on the market, such as robotic arms.

Figure 2:
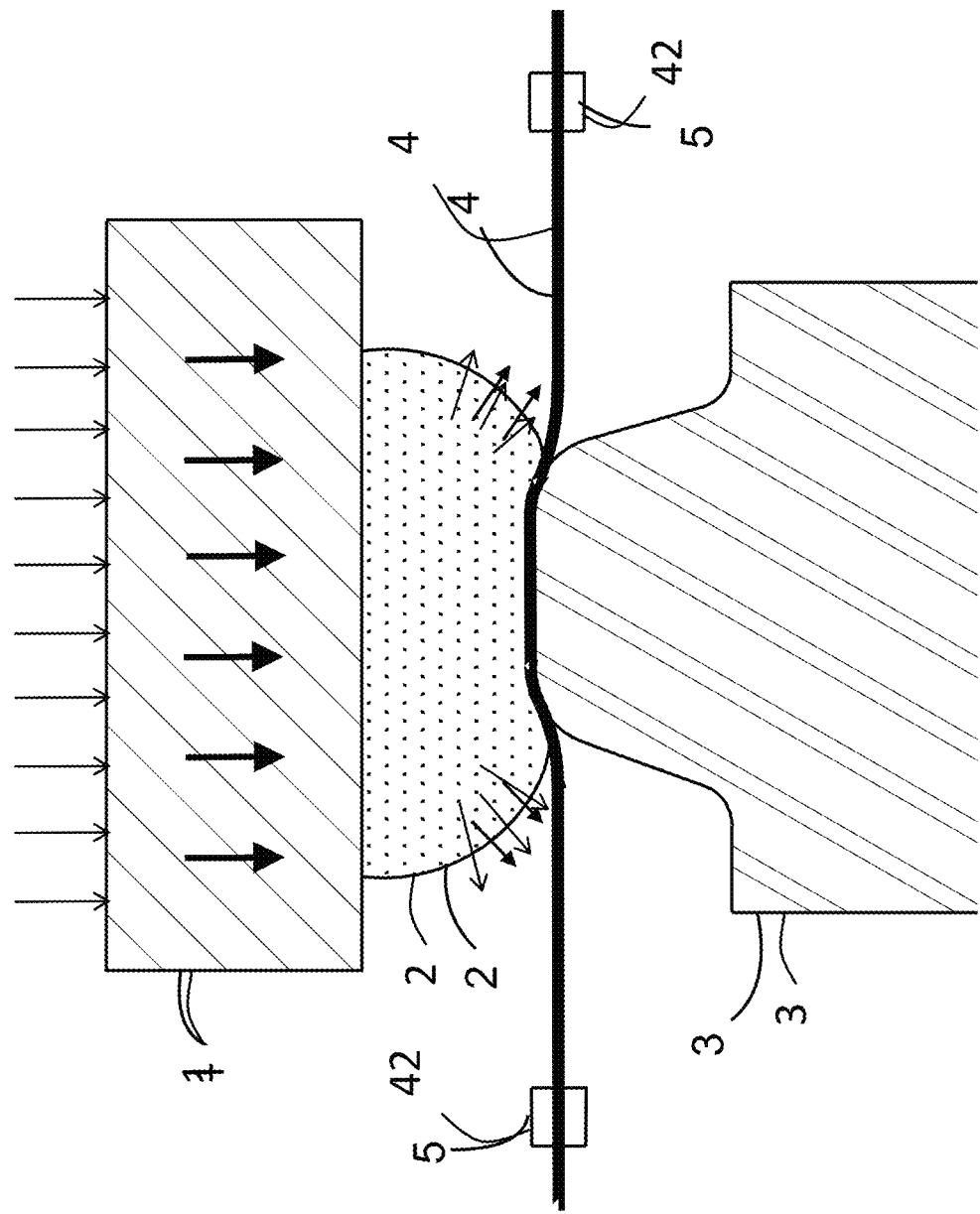
FIG. 2 shows a cross sectional view of the adaptation system in the initial moments of the adaptation phase according to claim 2.

FIG. 2 shows a cross sectional view of the adaptation machine according to claim 2, specifically in the initial moments of the fibre adaptation phase. The system consists of a matrix (1) that can have different shapes, on the surface of which an easily deformable body (2) is adhered, which has a specific initial geometry and which depends on the shape of the part to be manufactured. The mould (3) is located such that the deformable body is located between said mould (3) and the matrix (1).

After positioning the fibre structure (4) supported by the fibre securing system (5) between the deformable body (2) and the mould (3), the matrix (1) is moved towards the mould at a certain speed, according to claim 2, preferably with the aid of a press, so that the deformable body is compressed against the mould (3), forcing the fibre structure (4) to progressively adopt the shape thereof, which enables the stress between layers to be reduced, avoiding the appearance of misalignments or wrinkles in the fibres (4) and making it possible to obtain preforms from fibres pre-impregnated with resin.

During the adaptation of the fibres (4) that are initially arranged in a two-dimensional plane, the fibres (4) slide with respect to the securing elements (42) as they take on a three-dimensional shape.

It is important to note that it is envisaged that the securing elements (42) have independent movement and according to the degrees of freedom that the adaptation of the fibres (4) requires. That is, said elements (42) could remain immobile throughout the entire process, move freely according to certain degrees of freedom, have forced movement according to said degrees of freedom, or a combination of the above.

Figure 3:
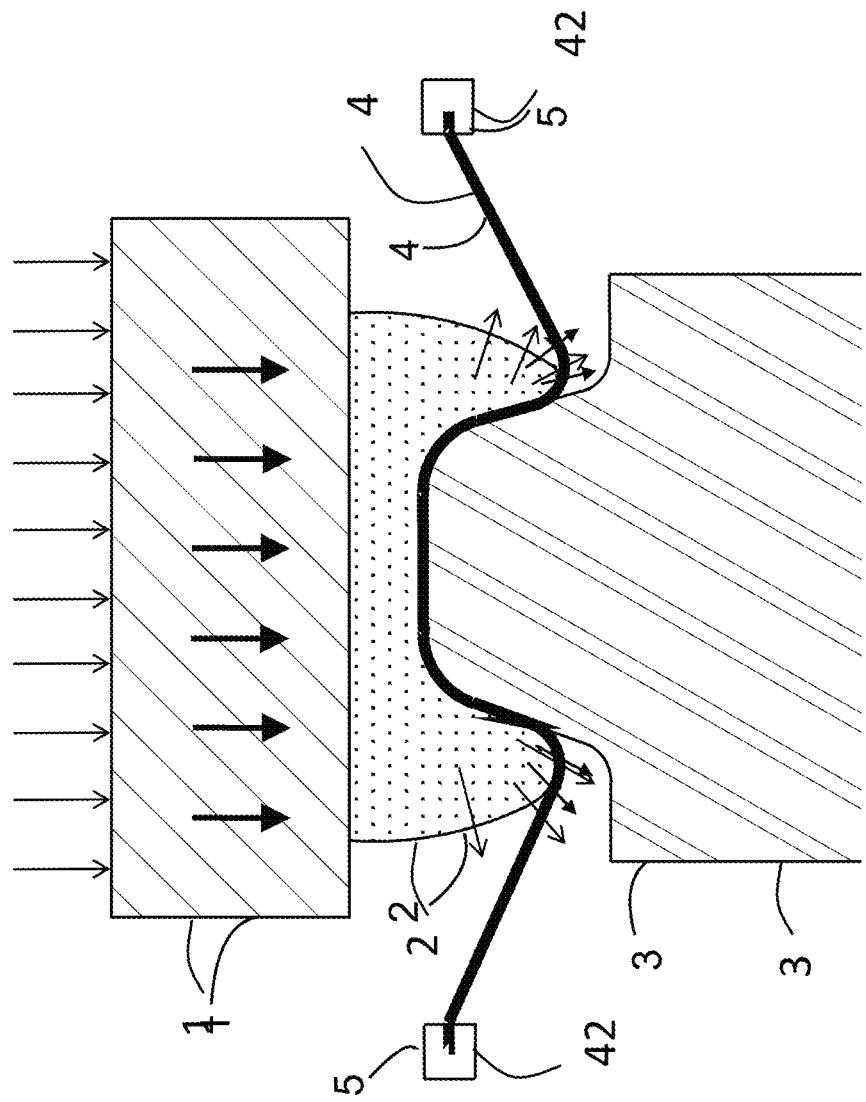
FIG. 3 shows a cross sectional view of the adaptation system at an intermediate point of the adaptation phase according to claim 2.

FIG. 3 is similar to FIG. 2, showing in this case the adaptation phase in a more advanced state, wherein the fibre structure (4) has already partially adopted the shape of the mould (3). It should be noted that, in the example shown, the fibre securing system (5) maintains the necessary stress but at the same time enables the sliding thereof.

Figure 4:
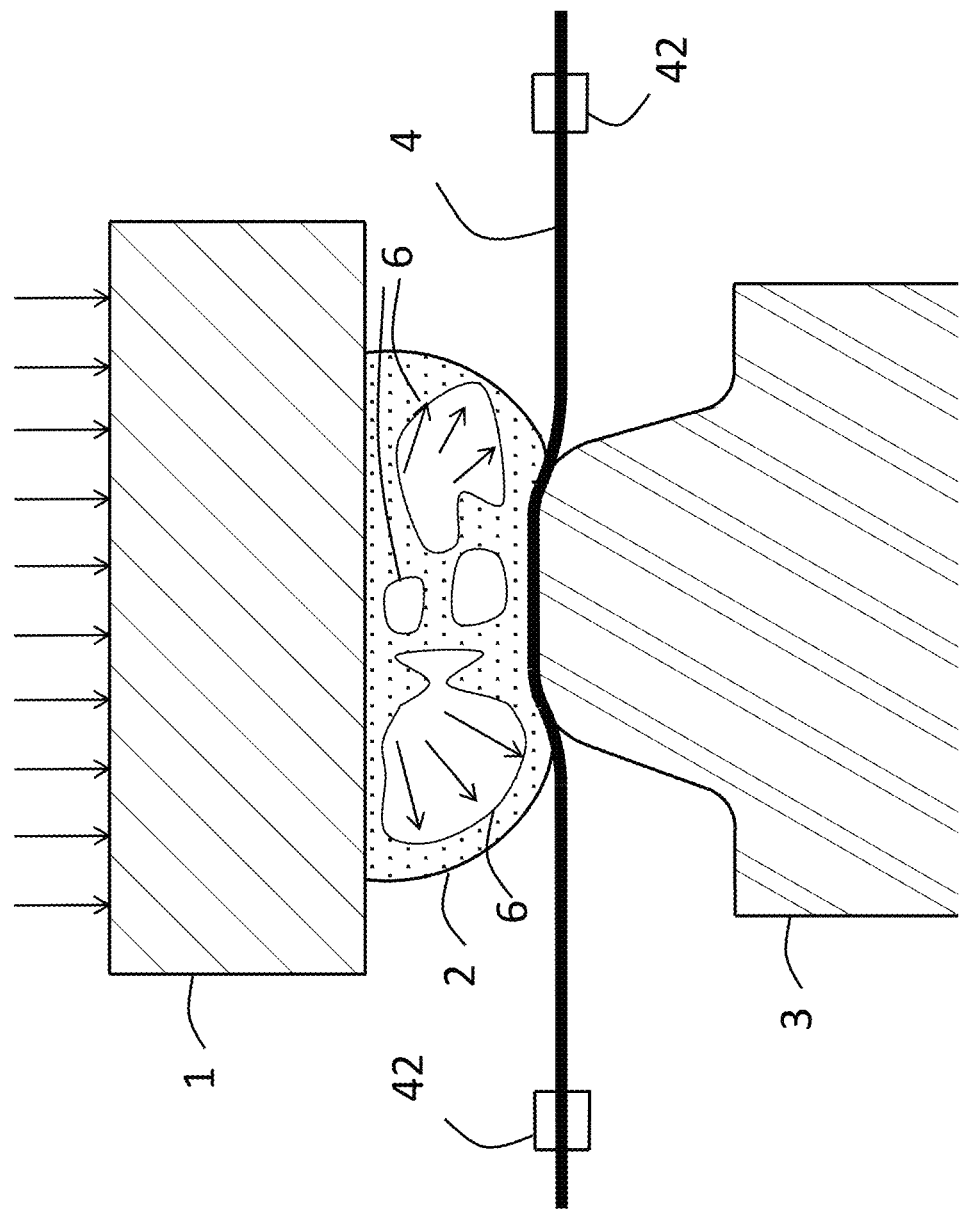
FIG. 4 is similar to FIG. 2, showing different features in the deformable body according to claim 3.

FIG. 4 is similar to FIG. 2, showing the deformable body (2) with different features, according to claim 3, said body (2) being elastically deformed, without reaching plasticity or creep, and having cavities, ducts, porosities or any combination of the above (6), and containing a gas or a liquid enclosed therein. By means of a suitable design of said cavities (6), the body is caused to be deformed according to the optimal sequence for adapting the fibre structure (4). Note that the adaptation effect is the same as in the case of FIGS. 2 and 3, and that the difference is the deformation phenomena that take place.

Figure 5:
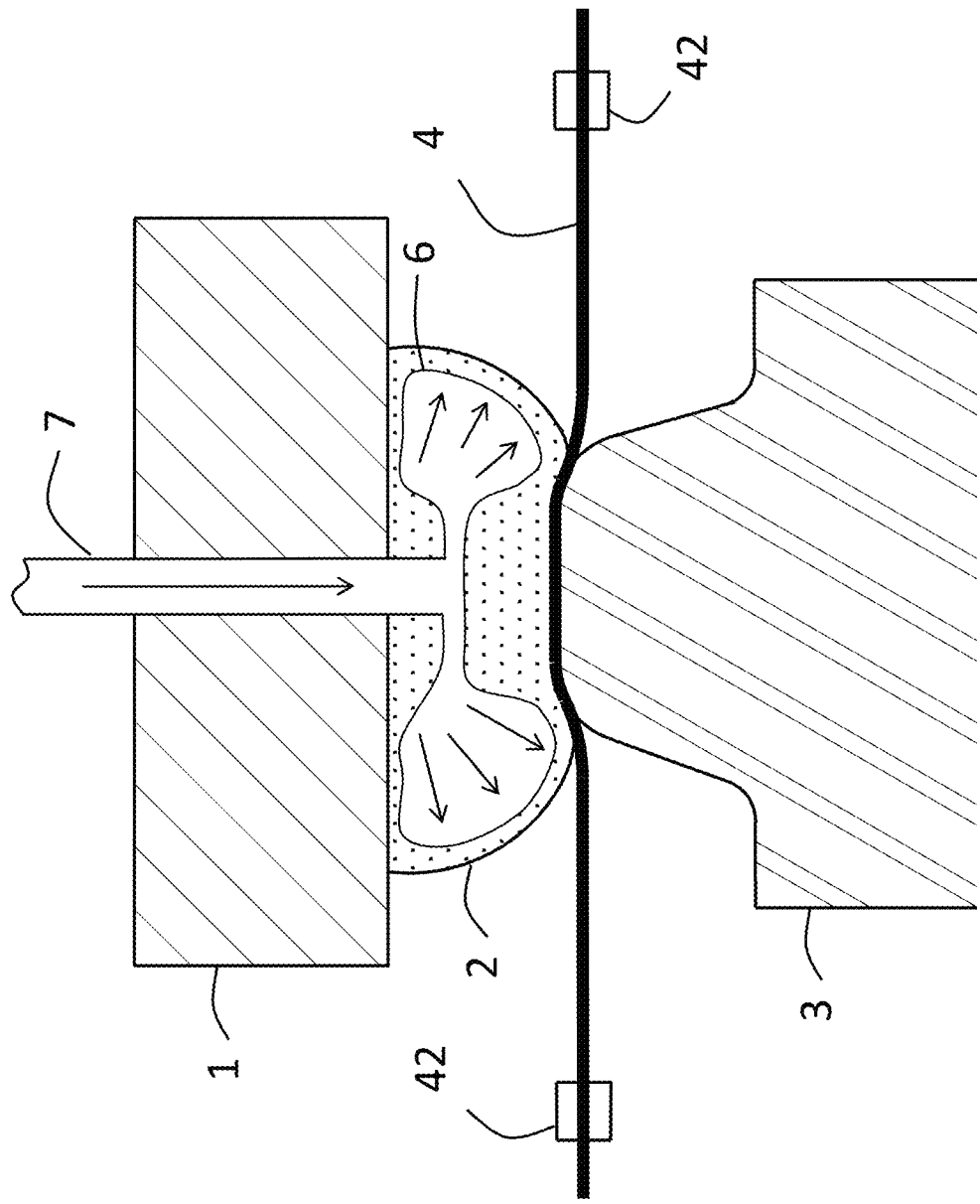
FIG. 5 is similar to FIG. 4, showing another method for deforming the deformable body according to claim 4.

FIG. 5 shows a cross sectional view of the adaptation machine according to claim 4, wherein the deformable body (2) is made of an elastic material, which is deformed without reaching plasticity or creep, and which has cavities, ducts, porosities or any combination of the above (6), and containing therein a gas or a liquid connected to the outside through at least one duct (7).

In this case, instead of moving the matrix (1) towards the mould (3) to achieve the adaptation, a gas or a liquid is injected through at least one duct (7) into the deformable body (2) causing an increase in volume therein. By means of a suitable design of said cavities (6), the deformation sequence can be controlled to produce the desired adaptation.

Figure 6:
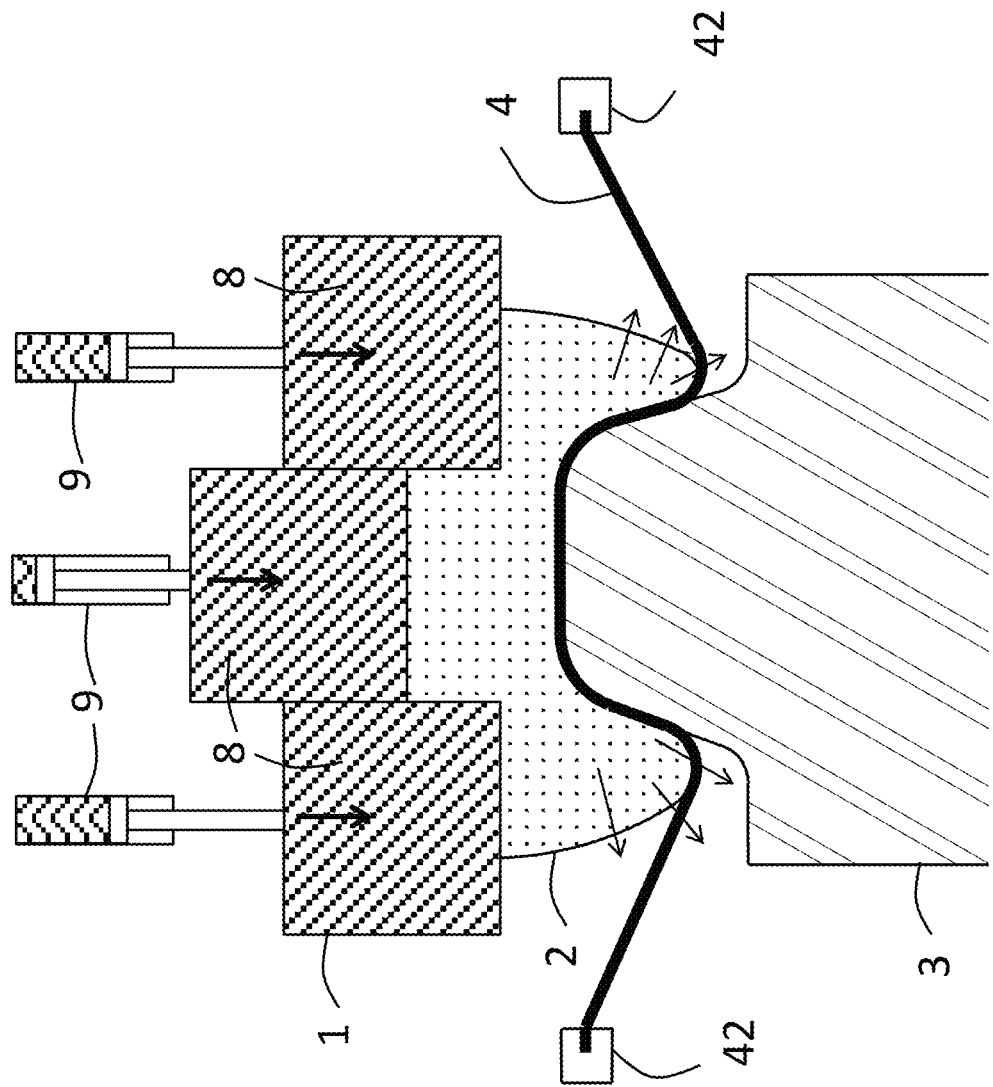
FIG. 6 is similar to FIG. 2, showing a matrix formed by different elements with independent movement.

FIG. 6 is similar to FIG. 2, showing in this case, as envisaged in claim 25, a matrix (1) divided into several elements (8) that are independently moved by means of mechanical actuators, preferably hydraulic cylinders (9), describing that stated in claim 2. Therewith, greater control of the deformation sequence is achieved, enabling the adaptation of more complex mould geometries.

Figure 7:
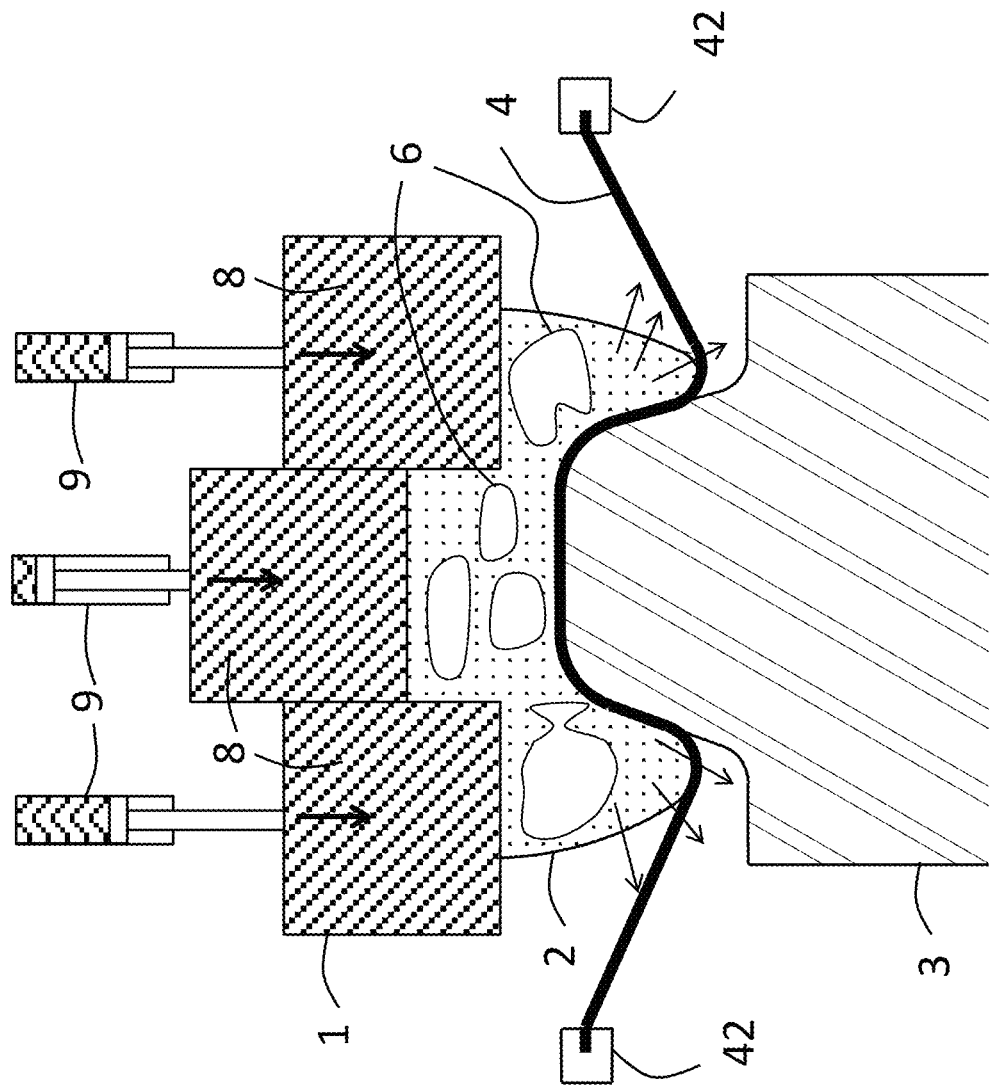
FIG. 7 is similar to FIG. 6, showing a system of cavities or pores in the deformable body.

FIG. 7 is similar to FIG. 6, showing in this case a deformable body (2) according to claim 3, which is elastically deformed, without reaching plasticity or creep, and which has cavities, ducts, porosities or any combination of the above (6), and containing a gas or a liquid enclosed therein.

Figure 8:
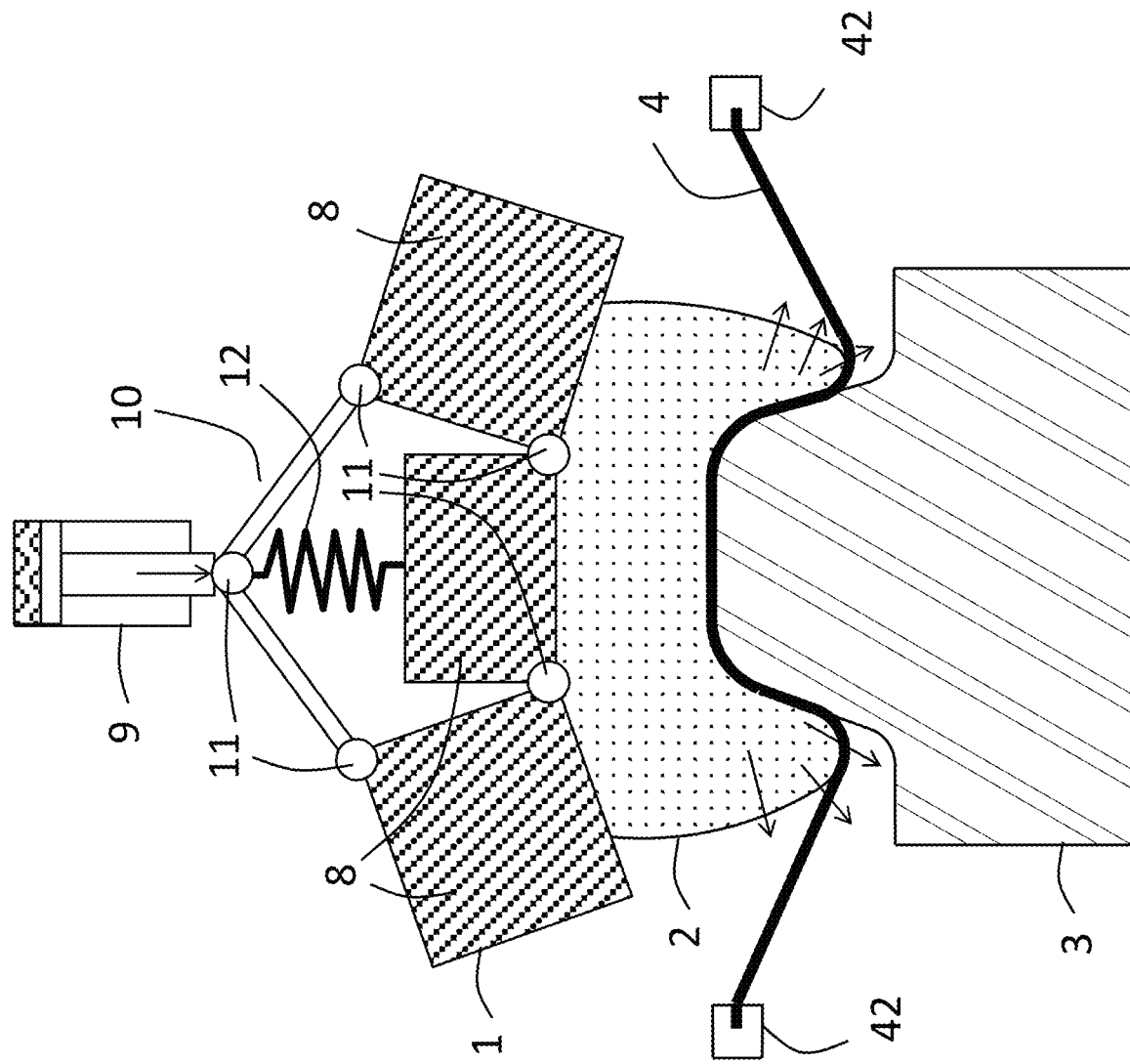
FIG. 8 is similar to FIG. 3, showing a matrix formed by different joint elements operated by a single actuator.

FIG. 8 is similar to FIG. 3, showing in this case a matrix (1) divided into several elements (8) joined by means of any mechanism (10), stated in claim 26, which is actuated by means of a mechanical actuator, preferably a hydraulic cylinder (9). This figure shows an example of a mechanism (10) containing joints (11) and a spring (12), by means of which the entire system is caused to work with a single actuator (9).

Figure 9:
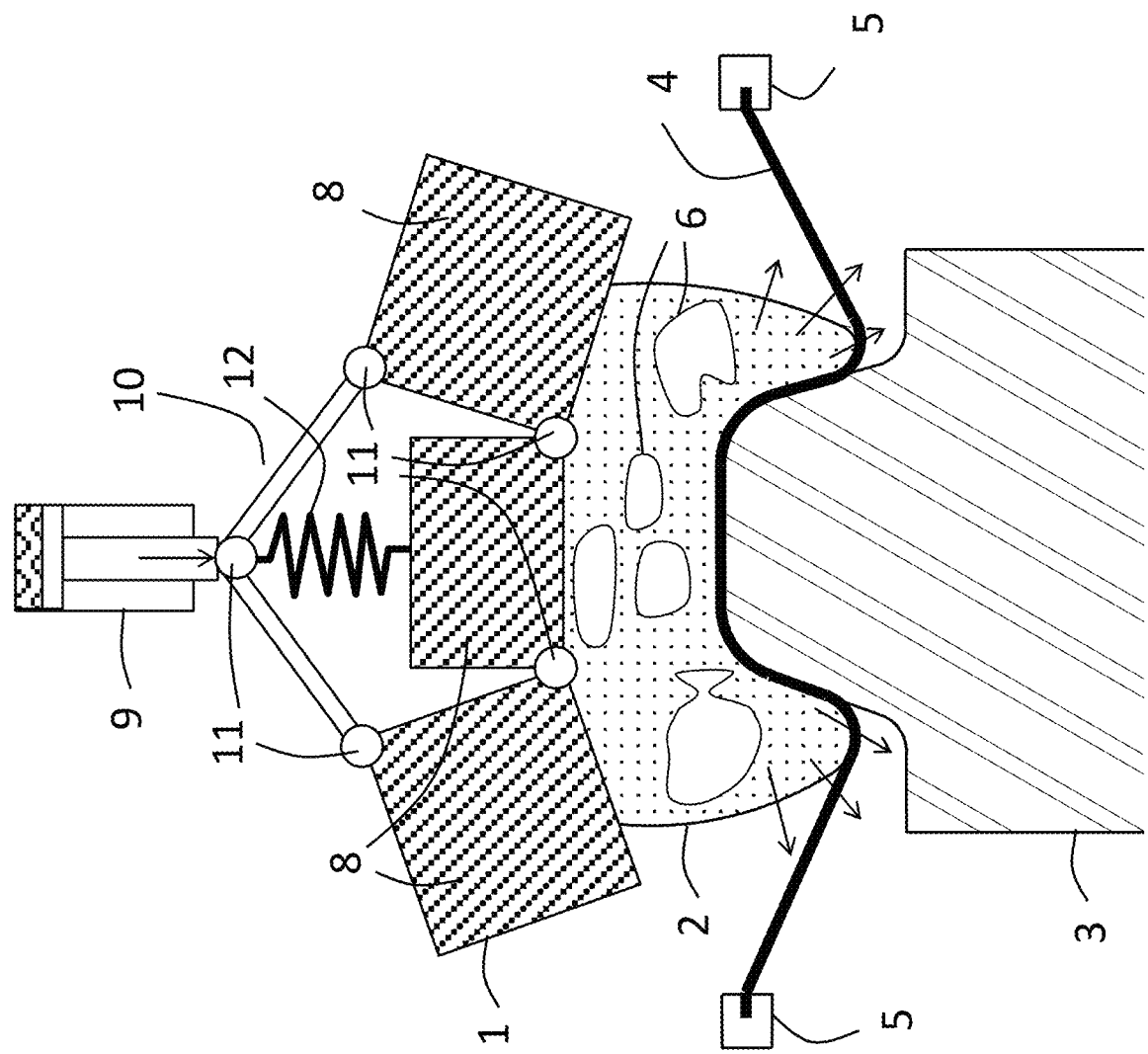
FIG. 9 is similar to FIG. 8, showing different features in the deformable body, according to claim 3.

FIG. 9 is similar to FIG. 8, showing in this case an elastic or viscoelastic deformable body (2) which has cavities, ducts, porosities or any combination of the above (6), according to claim 3, and containing a gas or a liquid enclosed therein. By means of a suitable design of said cavities (6), the body is caused to be deformed according to the optimal sequence for adapting the fibre structure (4).

Figure 10:
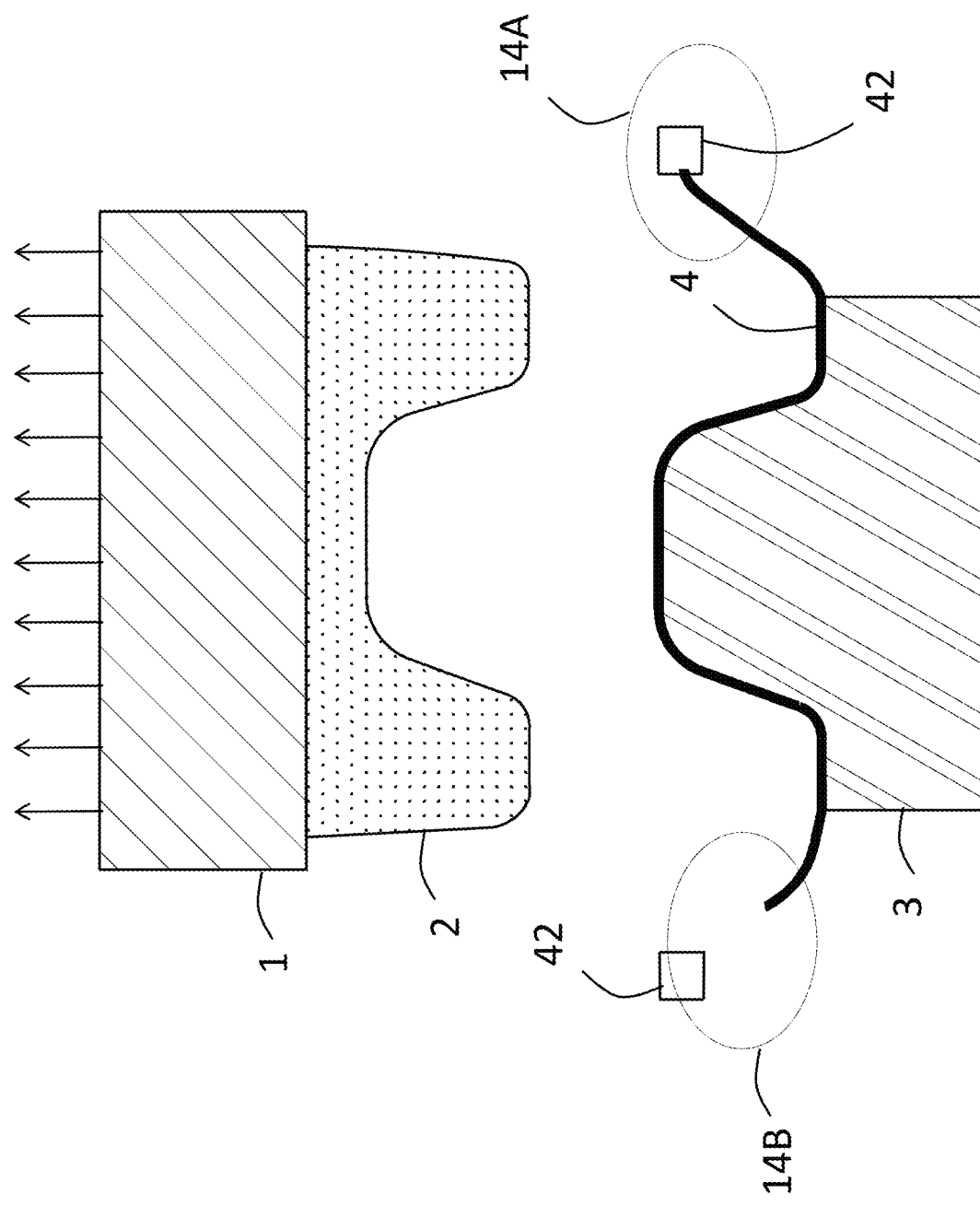
FIG. 10 shows a cross sectional view of the adaptation machine at the final moment of adaptation according to the preferred embodiment of the invention.

FIG. 10 shows a cross sectional view of the machine object of the present invention, at the moment when the adaptation of the fibres has been completed, specifically after the moment indicated in FIG. 3. In this case, the matrix (1) is lifted returning to the initial position thereof and releasing the already preformed fibres (4). It should be noted, as mentioned in claim 1, that the securing system (5) for the fibres enables the sliding thereof in the areas wherein it is necessary, being able to detach (14B) from said securing system (5) at the appropriate time, wherever the stress of the fibres is no longer required, or on the contrary, remain secured to the system (14A) until the end of the process of adaptation.

In the case shown in the present FIG. 10, the deformable body (2) is made of a material that is plastically deformed and that does not recover the initial geometry thereof when the pressure ceases, according to claim 2. It is therefore necessary to reshape said deformable body (2) to give it the initial shape thereof. That is why it is envisaged that the machine additionally comprises an additional restoration mould (24), as expressed in claim 5.

Figure 11:
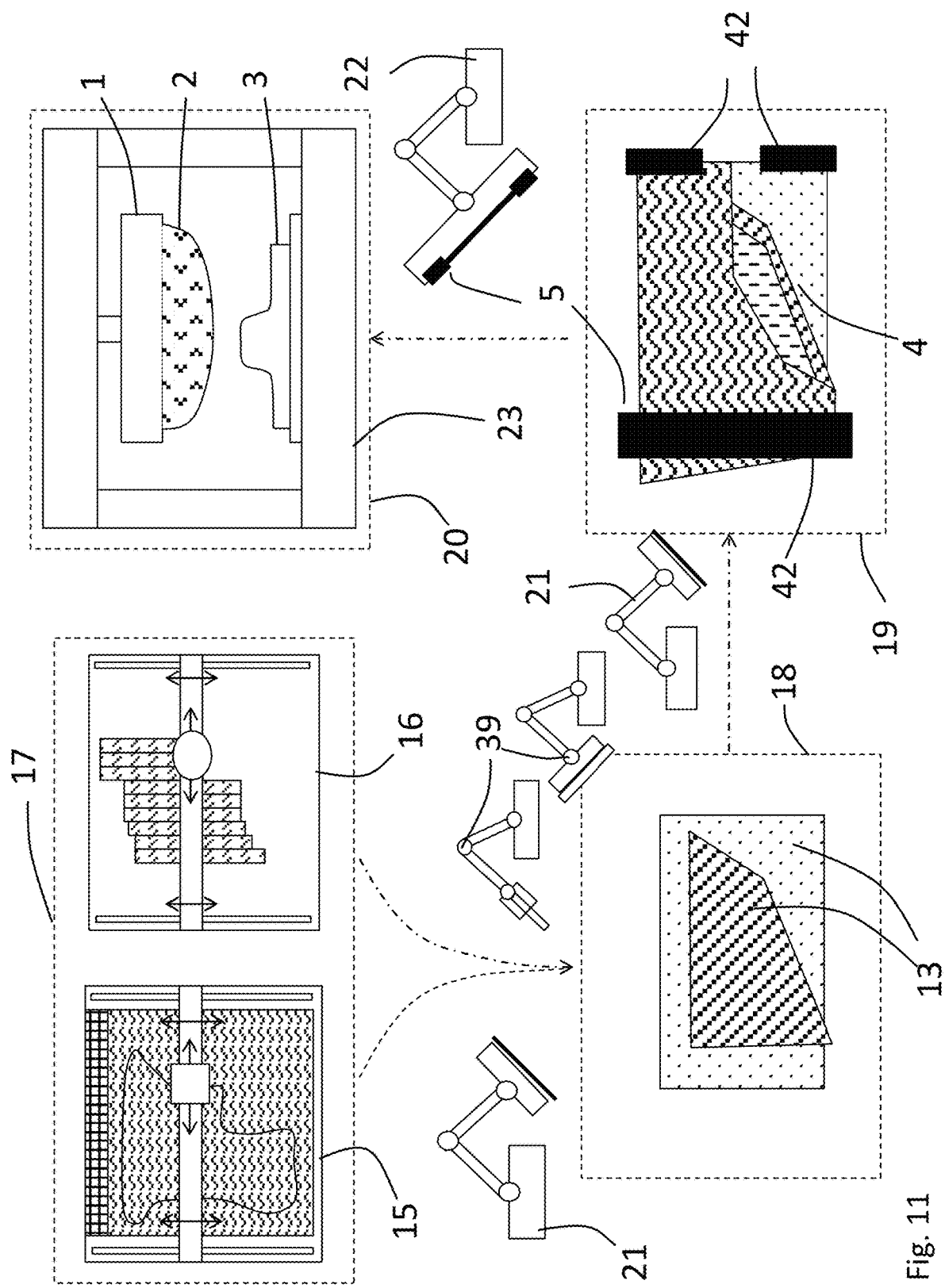
FIG. 11 shows a diagram of the complete process for obtaining an adapted part of fibres.

FIG. 11 shows a diagram of the process for obtaining the fibre preform, wherein the machine disclosed in the present invention is integrated, which corresponds in this case to areas (18) (19) and (20).

The area (17) corresponds to obtaining the fibre parts (13), by means of already existing processes such as cutting by numerical control (15) or automated fibre deposition systems (16), or AFP.

Next, the area (18) corresponds to the preparation of the layers of fibres (13) or layers, by means of an automated positioning system, such as the robot (21).

Within this space (18), the carrying out of joining processes between the layers that require it is also envisaged, such as sewing, the addition of an adhesive, or the application of pressure between two or more layers (13) in the case of being pre-impregnated with resin. Additionally, parts of core material for composites such as polymer foams, cork, wood or metal, and inserts of different materials can be inserted. It is important to note that the aforementioned additional processes that can take place during step (18) can be carried out in different positions within the production line, and are executed by automated tools such as the robots (39).

In the next area (19) the fibre structure (4) is fastened in the fibre securing system (5), which is detailed in FIG. 19, wherein the layers (13) are stacked and enclosed between the sheets (30) of the securing system, and can be previously stacked, sewn, with core material or presented individually. It is important to note that in the case of being presented individually, i.e., without additional sewing, core inserting or gluing operations, the layers (13) can come directly from the area (17) for obtaining said layers.

Regarding the fastening, note that it encompasses at least partially the contour of said layers (13).

In the area (20), corresponding to the adaptation, are located the shaping mould (3) and the matrix (1) together with the deformable body (2), wherein the securing system (5) is positioned, once it has been mounted together with the fibres (4) in the area (19). The placement of said securing system (5) together with the fibres (4) is preferably carried out by means of a robot (22) having a tool that secures each one of the elements (42) of the securing system.

The additional mould (24) for restoring the initial shape of the deformable body (2) is not detailed in the present figure.

Figure 12:
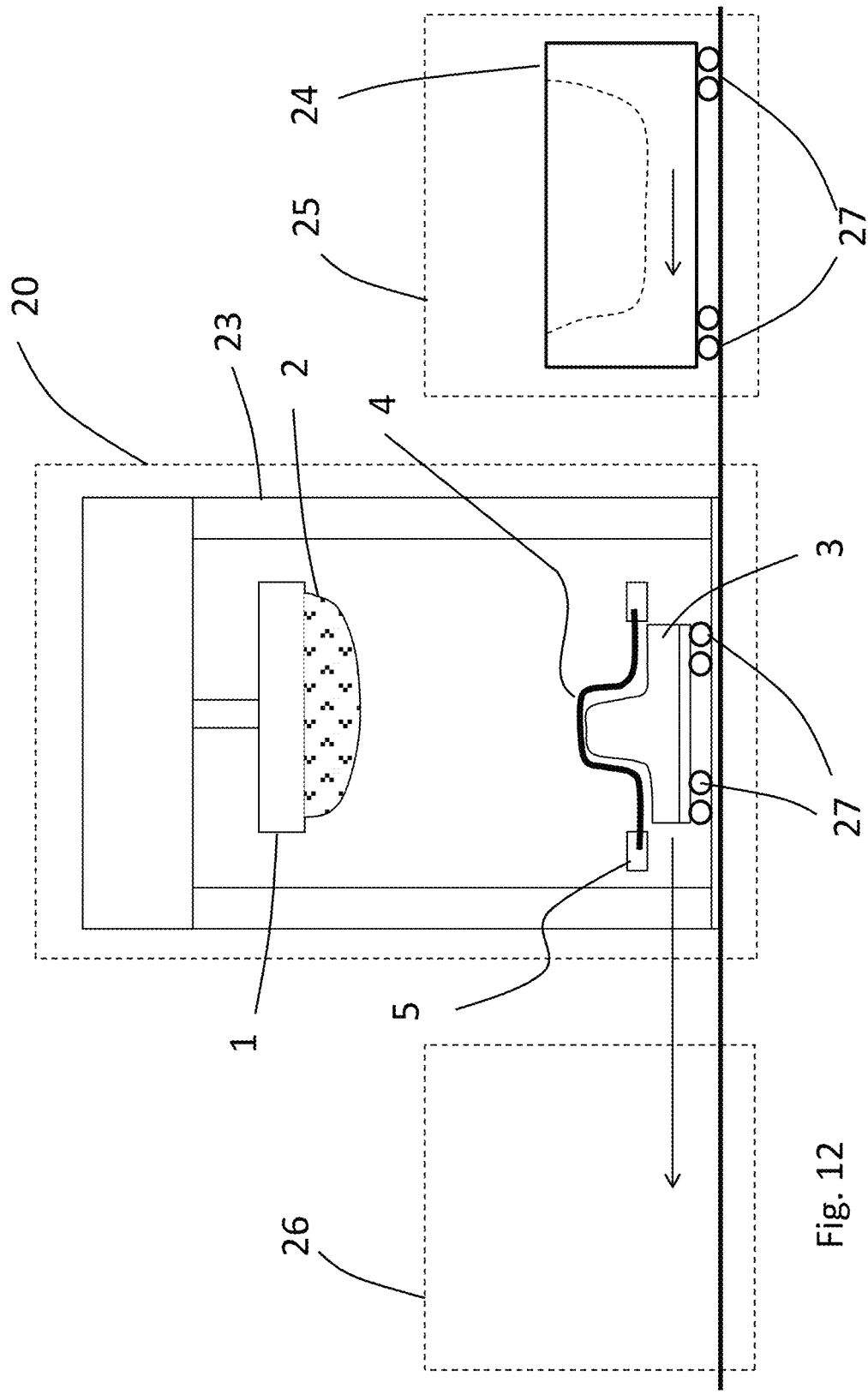
FIG. 12 shows a diagram of the restoration system integrated in the machine for adapting fibres according to claims 5 and 6.

FIG. 12 shows a diagram of the restoration system that is part of the fibre adaptation machine object of the present invention, wherein the fibre adaptation and restoration are carried out in the same place (20), and by means of the same press (23), according to claim 6, wherein it is stated that the mould (3) and the additional restoration mould (24) have a movement system (27) that enables them to be alternately aligned with the matrix (1). Note that when the additional restoration mould (24) is aligned with said matrix (1), in the press (23), the shaping mould (3) moves to another position (26) wherein a robot is expected to collect the adapted fibres (4), and position, on said shaping mould (3) new fibres by means of the securing system (5) proposed in the present invention.

The present figure shows the operation of the machine at the moment in which the fibre structure (4) has already adopted the required shape and the additional restoration mould begins the movement towards the position in alignment thereof with the matrix (1) at the same time in which the shaping mould (3) moves towards the area (26).

Once said additional restoration mould (24) is positioned in alignment with the matrix (1), the deformable body (2) is compressed by means of the press (23) between said elements (1) and (24) to recover the shape of said deformable body (2).

It is important to note that it is also envisaged that the restoration is carried out in a place other than that for adaptation of fibres (20), in which case, stated in claim 7, the matrix (1) has a system that enables it to uncouple from the press (23) to be transferred to the position occupied by the additional restoration mould (24).

Figure 13:
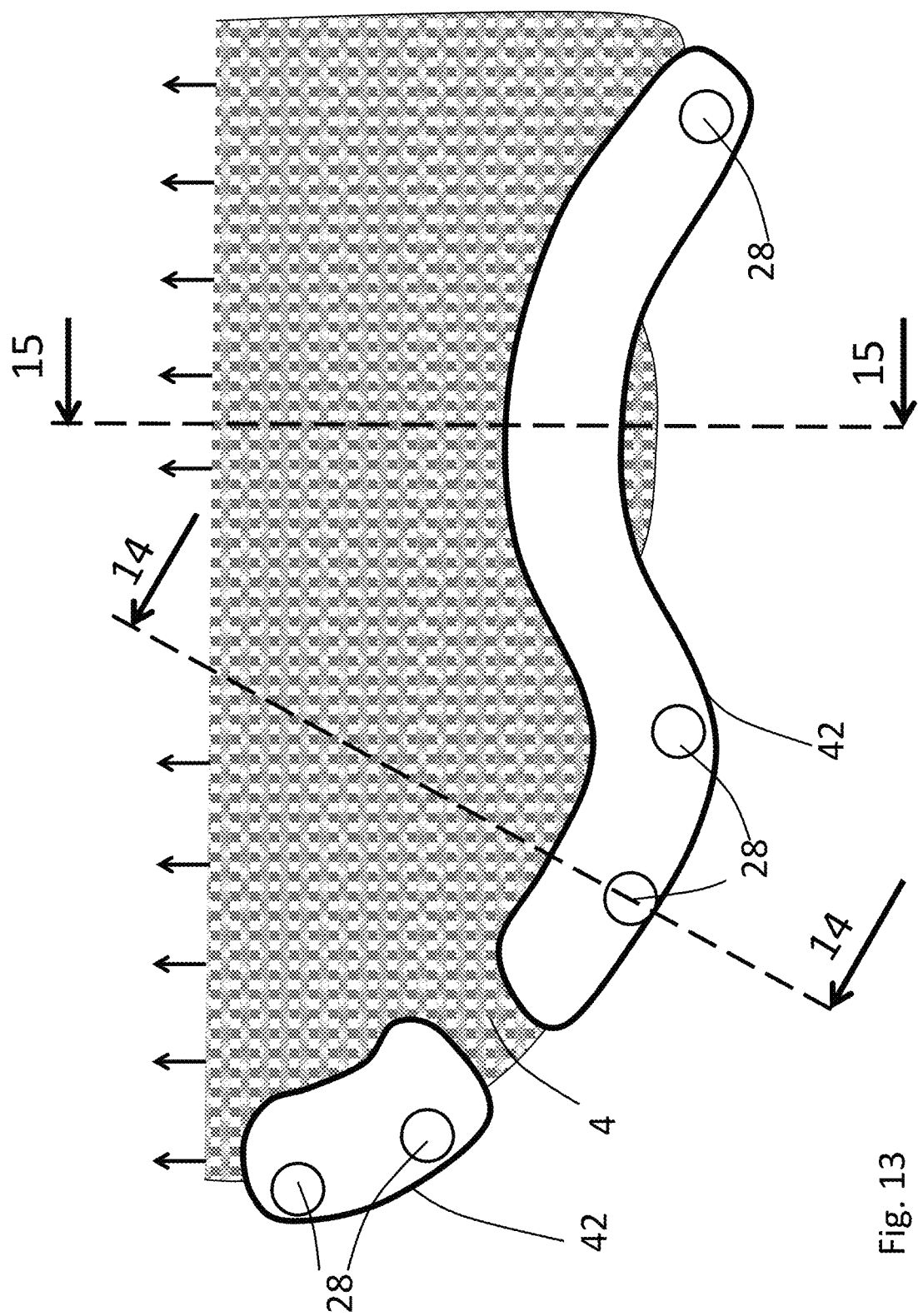
FIG. 13 shows a plan view of a fibre structure secured by means of a fibre securing system according to claim 1.

FIG. 13 shows a partial plan view wherein two elements (42) that form part of the fibre securing system (5) can be seen. The fibre structure (4) is secured in those areas where it is necessary by means of at least one element (42), which have a closure system (28) that acts on at least one point of each element (42). Alternatively other types of closure are envisaged such as clamps, pins or threads. The upper or closure frame (31) is the element that gives consistency to the securing system together with the lower frame (29) located below, so it is not displayed in the present figure.

Figure 14:
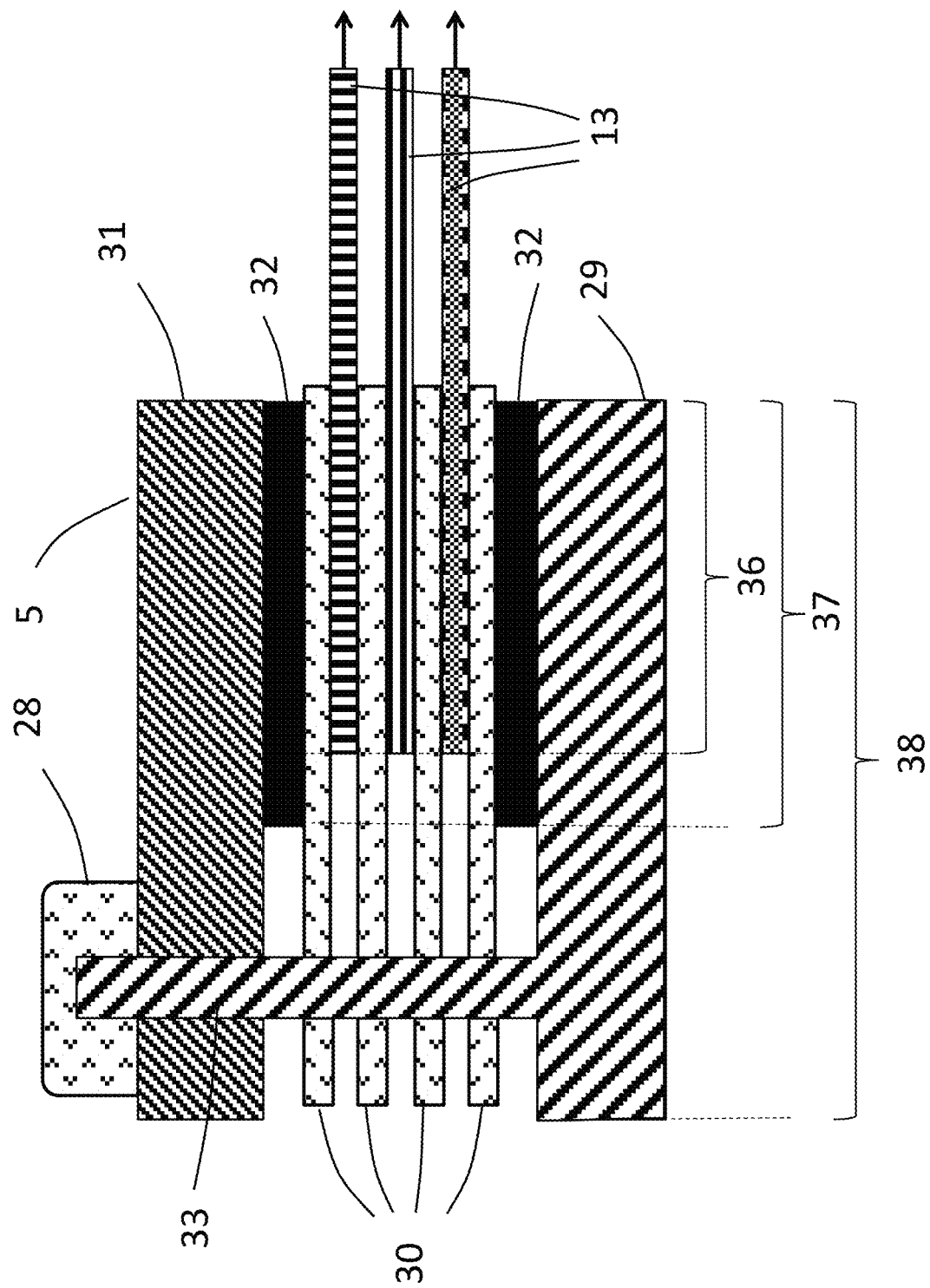
FIG. 14 shows the cross section 14-14 of an element of the fibre securing system according to FIG. 13.

FIG. 14 shows a cross sectional view of cross section 14-14, indicated in FIG. 13, of an element (42) of the fibre securing system. It shows the lower frame (29) which, together with the upper or closure frame (31) provide consistency to the securing system, and can be manufactured from any material, according to the requirements of each preform, for example aluminium, steel sheet metal or a polymeric material. Between both frames (29) and (31) separation sheets (30) are located on both sides of each layer of fibres (13). Said sheets (30) are preferably made of a flexible material coated with a non-stick medium, such as Teflon or non-stick silicone, to enable the sliding of the fibre layers. Alternatively, they can be made directly of said non-stick material.

Between each one of the frames (29) and (31) and the adjacent separation sheets (30) an elastic element (32) is placed, such as a flexible polymer foam or an elastomer, which covers an area (38) greater than or equal to the effective securing area (36), i.e., the region of the fibres (13) that is covered by the securing element (42) at the initial moment of preforming. Said flexible material (32) envelops the fibres (13) and the objective thereof is to distribute the pressure exerted by the frames on the fibres (13) in a homogeneous way, thus avoiding pressure concentrations that can cause distortions in the directions of the fibres (13) when sliding relative to the sheets (30) due to an excessive frictional force.

In order to ensure the consistency of each securing element (42), a coupling system is placed so that the lower frame (29), the separation sheets (30) and the upper or closure frame (31) do not have relative displacement with respect to the plane thereof. This coupling system is, according to the present figure, a coupling element (33) (cylindrical pin) solidly joined to the lower frame (29) and which passes through the made-to-measure holes located in the sheets (30) and the upper frame (31), so that the only enabled movement of the elements relative to each other is according to the normal to the plane of the fibres.

Additionally, the closure (28) of the securing system is located, the objective of which is to exert adequate pressure on the fibres (13) to thus generate the necessary stress in the fibres by means of friction phenomena. In the present figure, said closure (28) is an element into which the coupling element (33) is inserted, one being retained with respect to the other, for example, by means of a threaded joint, a pin, etc. In this way the closure (28) exerts the required force on the upper or closure frame (31). It is important to note that the lower (29) and upper (30) frames are provided with anchoring elements that are not detailed, and that serve for the fastening thereof in the different areas of the adaptation machine, as well as for the transport or storage thereof.

Figure 15:
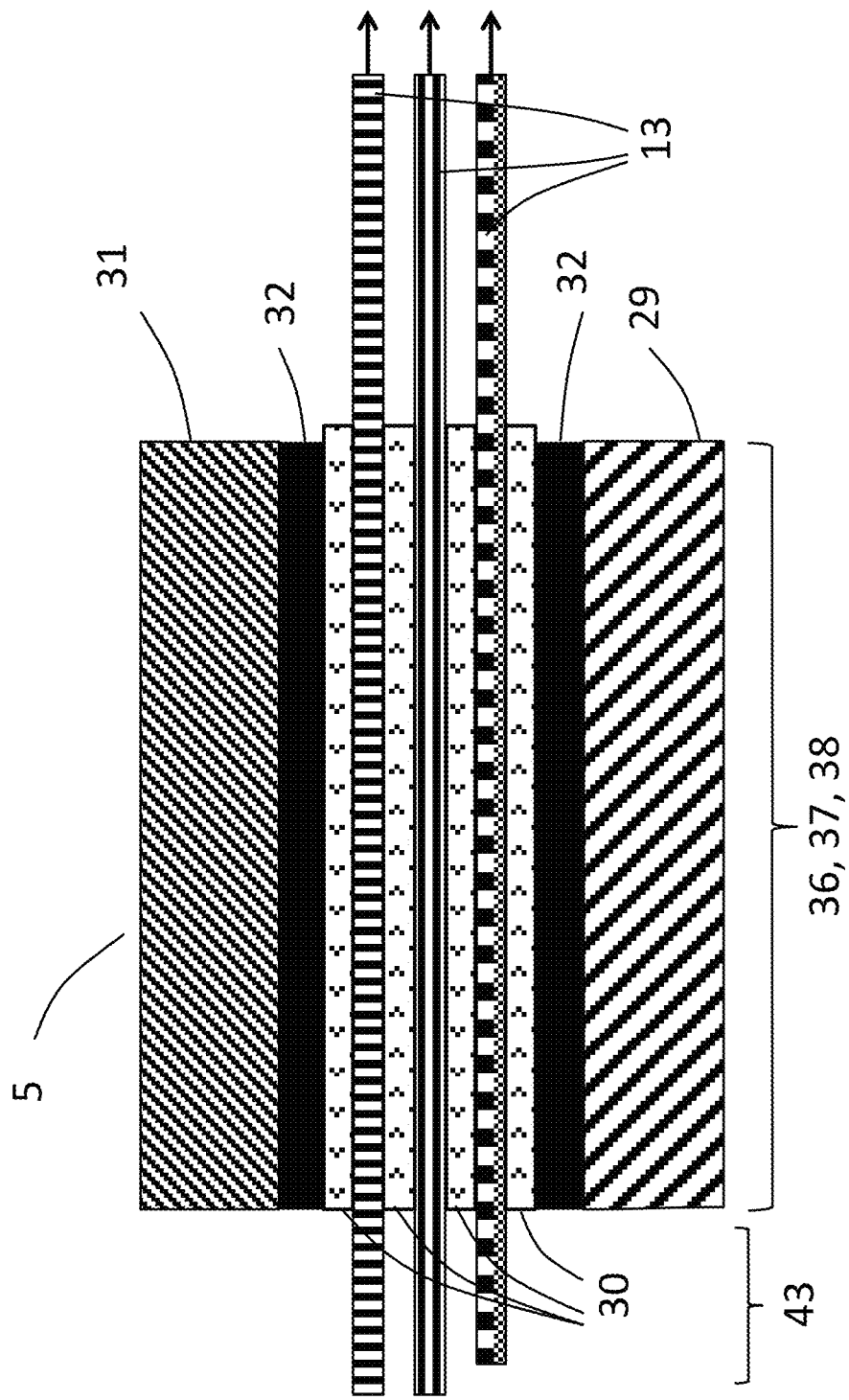
FIG. 15 shows the cross section 15-15, a cross section of an element of the fibre securing system according to FIG. 13.

FIG. 15 shows a cross sectional view of cross section 15-15, indicated in FIG. 13, of an element (42) of the fibre securing system, and is similar to FIG. 14. In this case, the coupling element (33) and the closure (28) are not seen since they are in another section of the securing element (42).

The fibre structure (4) protrudes (43) from the securing system to enable a greater sliding distance of the fibres during the preforming process, in areas that so require it. Note that the elastic element (32) encompasses the entire area (37) of the lower (29) and upper (31) frames.

Figure 16:
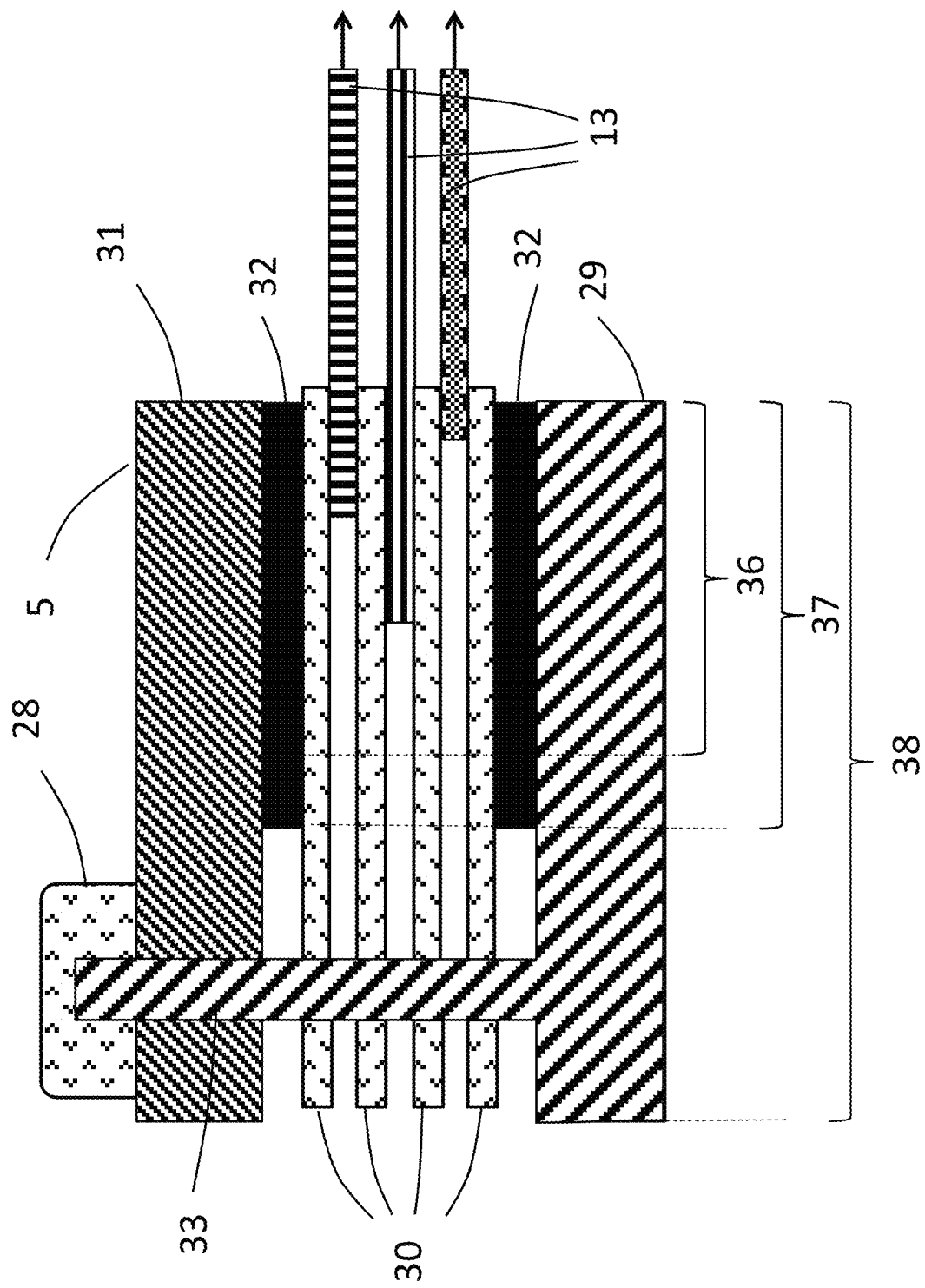
FIG. 16 is similar to FIG. 14, showing the independent sliding that has occurred in the layers of fibres during adaptation.

FIG. 16 shows the same section as FIG. 14 at a later moment, specifically, during the preforming process, which shows how each one of the fibre layers (13) have slid independently with respect to the securing element (42), to the extent that is required by the process.

Figure 17:
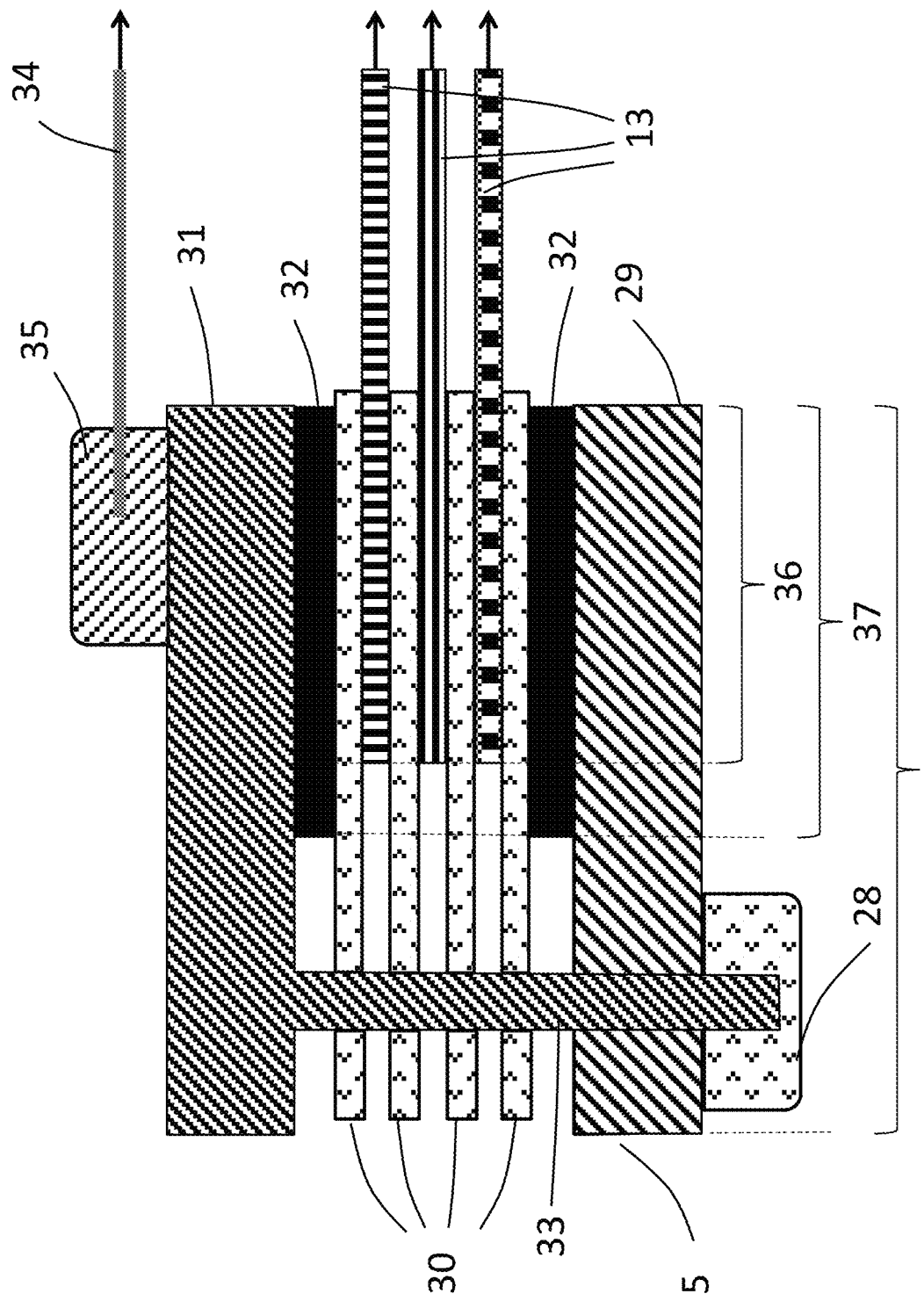
FIG. 17 is similar to FIG. 14, showing in this case the elastic film and a fastening system.

FIG. 17 shows the same cross section as FIG. 14, showing in this case an additional element, specifically, an elastic film (34), which is secured by means of a fastening system (35) that is not detailed, such as clamps or a tensioning frame, and which may or may not enable said film (34) to slide.

Figure 18:
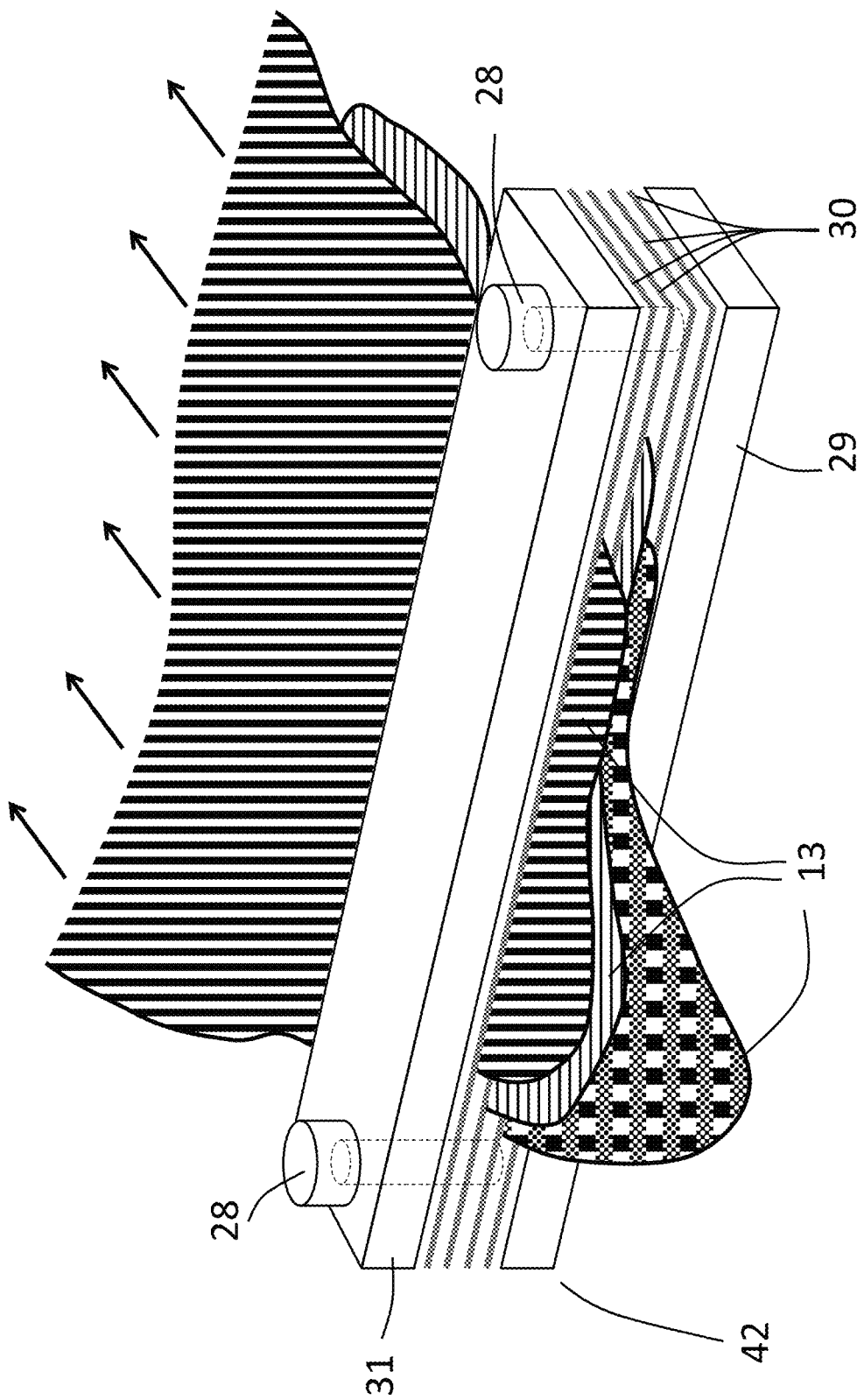
FIG. 18 shows a perspective view of a securing element that is part of the fibre securing system.

FIG. 18 shows a perspective view of a fibre securing element (42) according to the present invention, wherein the layers of fibres (13) are seen placed between the separation sheets (30) located in turn between the lower frame (29) and the upper or closure frame (31). The closure elements (28) provide the closure force that is transmitted to the fibres by means of the frames (29) and (31), thanks to which the tensioning effect is achieved by means of friction phenomena.

FIG. 19 shows a disassembled fibre securing system (5), wherein the ease of automation presented by said securing concept can be seen. For the assembly thereof, first of all, the lower frame (29) is placed on a surface or tool (40) located in the lower area (19B) for stacking layers (13) and for mounting the fibre securing system, wherein there is a support element (41) that prevents the layers (13) from sinking during stacking. Subsequently, preferably by means of an automated system that contains the remaining elements of the securing system (5), a separation sheet (30) is positioned. Next, preferably by means of an automated system, such as the robot (21), a layer of fibres (5) is placed in the desired position. The process is continued by alternately placing as many layers (13) and sheets (30) as necessary for each preform, placing a last sheet (30) followed by the upper or closure frame (31). Finally, the closure (28) is installed to apply the necessary force on the fibres (13), such that there is the required stress therein during the adaptation thereof to the shaping mould (3).

Figure 20:
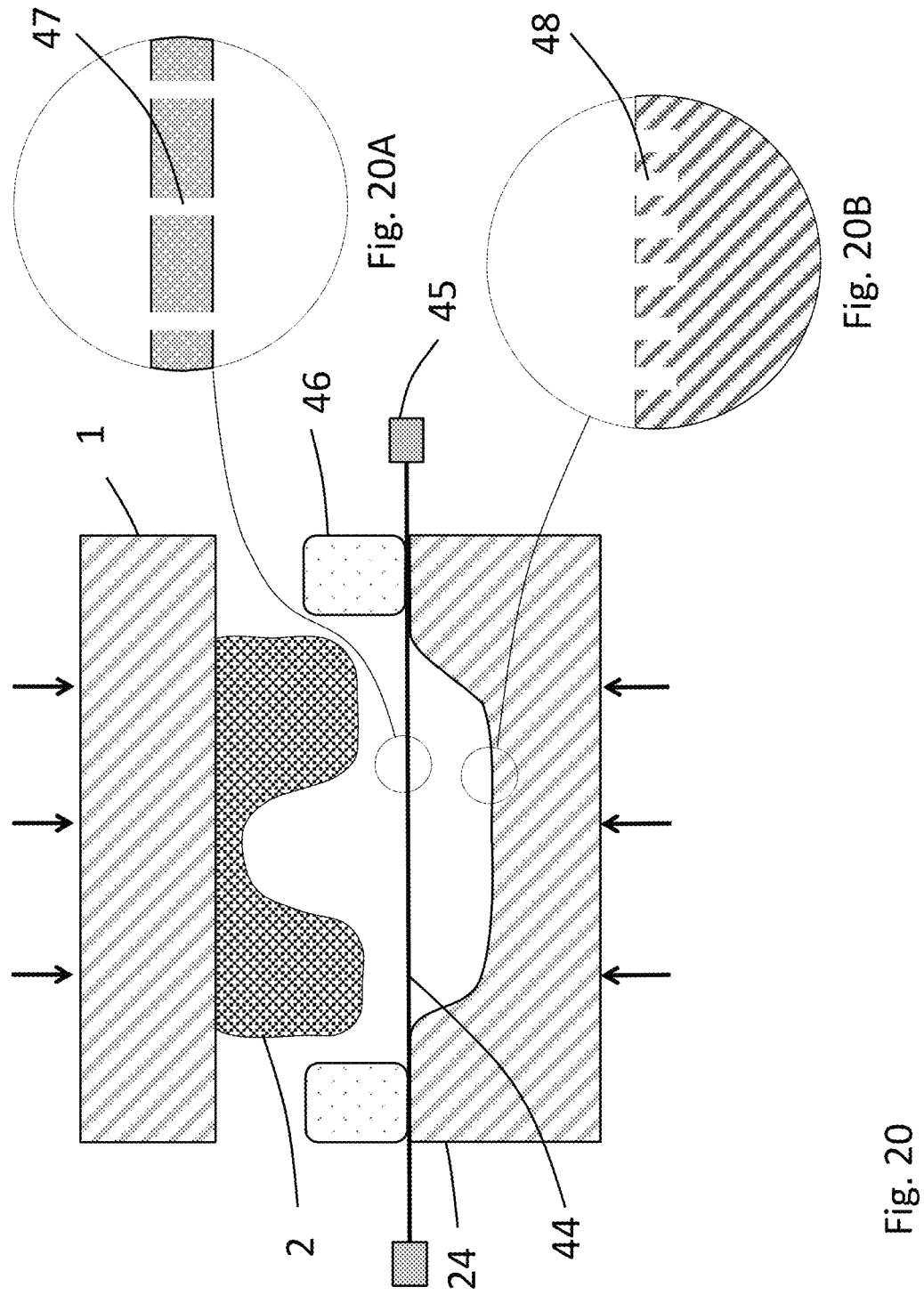
FIG. 20 shows a cross section of the elements of the system for restoring the geometry of the deformable body according to claim 14.

FIG. 20 shows a cross section of the restoration system indicated in claim 13, wherein the additional restoration mould (24) and the matrix (1) are positioned such that the deformable body (2) is located between the same. The elastic film (44) positioned by means of the securing or tool (45), separates the deformable body (2) so that it does not adhere to the additional restoration mould (24). Said film (44) has perforations (47) that enable the evacuation of the air that would otherwise be enclosed between the deformable body (2) and the film (44), said perforations being small enough to prevent the deformable body (2) from being extruded therethrough.

Therefore, by compressing the matrix (1) against the additional mould (24), the deformable body (2) is forced to acquire the shape of said additional restoration mould (24), which is the one required to redo the process of adaptation.

The system further has an elastic gasket (46) located on the edge of the additional mould (24) and on the elastic film (44). Said elastic gasket (46) is compressed together with the deformable body (2) to prevent said deformable body from leaving the volume comprised between the matrix (1) and the additional mould (24).

Figure 21:
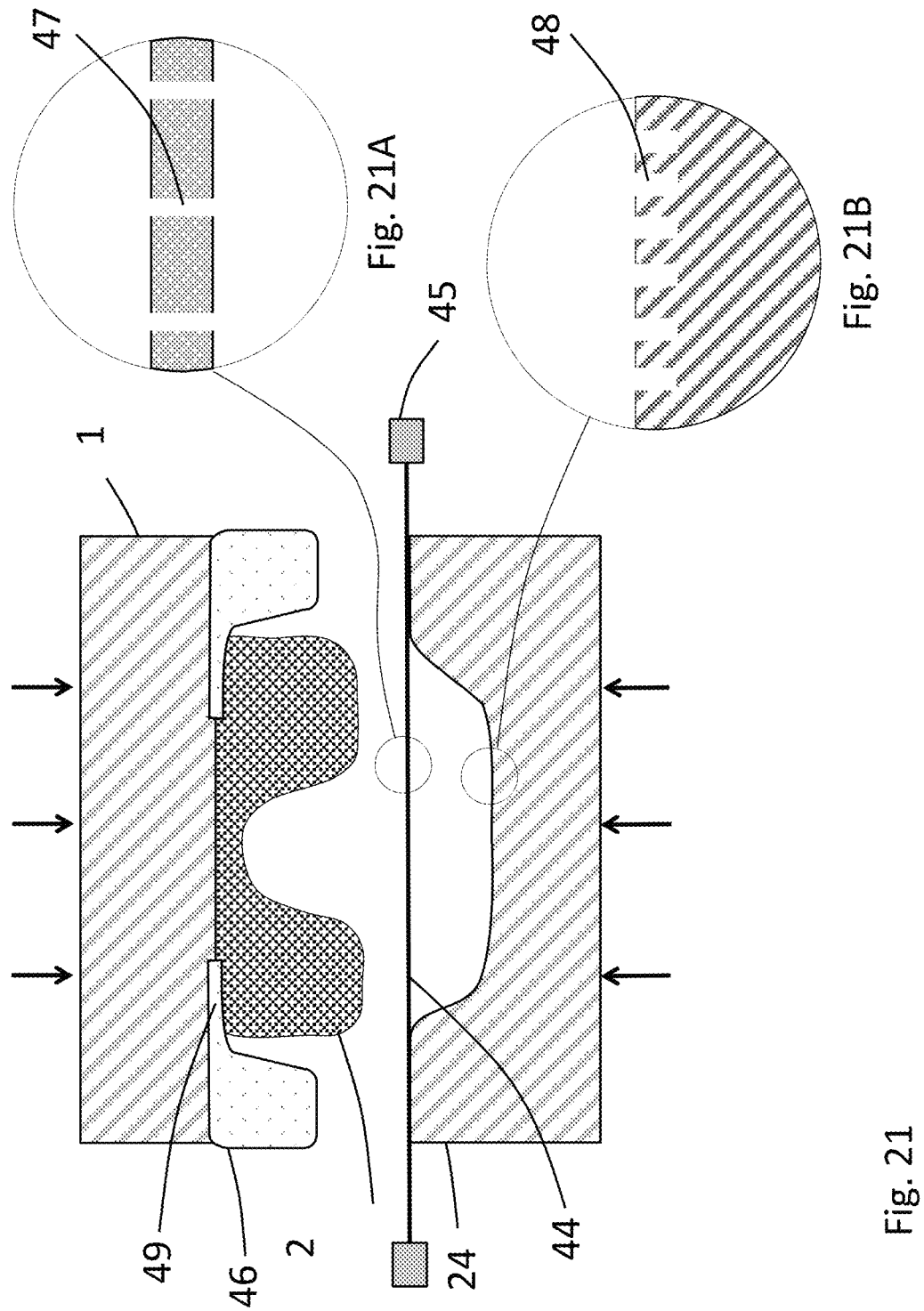
FIG. 21 is similar to FIG. 20, showing in this case a gasket solidly joined to the matrix, according to claim 15.

FIG. 21 is similar to FIG. 20, showing in this case a gasket (46) solidly joined to the matrix (1) and having a skirt (49) that is enclosed between said matrix and the deformable body (2), according to claim 14.

Figure 22:
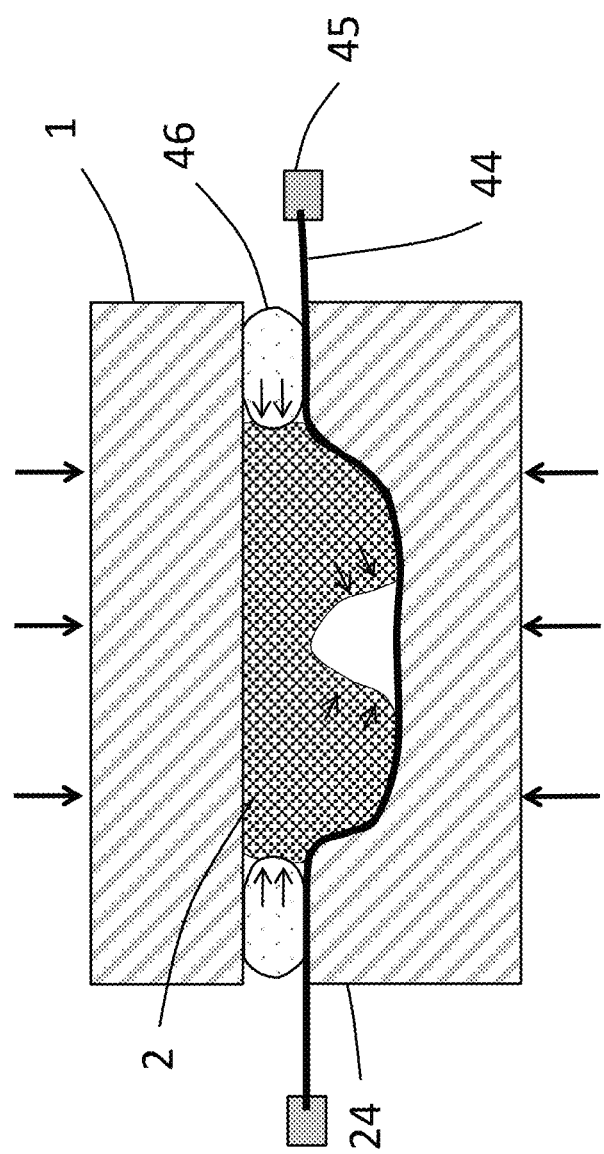
FIG. 22 is similar to FIG. 20, showing in this case a cross section during the compression of the deformable body on an additional mould.

FIG. 22 is similar to FIG. 20, in this case showing a cross section during the compression of the deformable body (2) on the additional mould (24).

Figure 23:
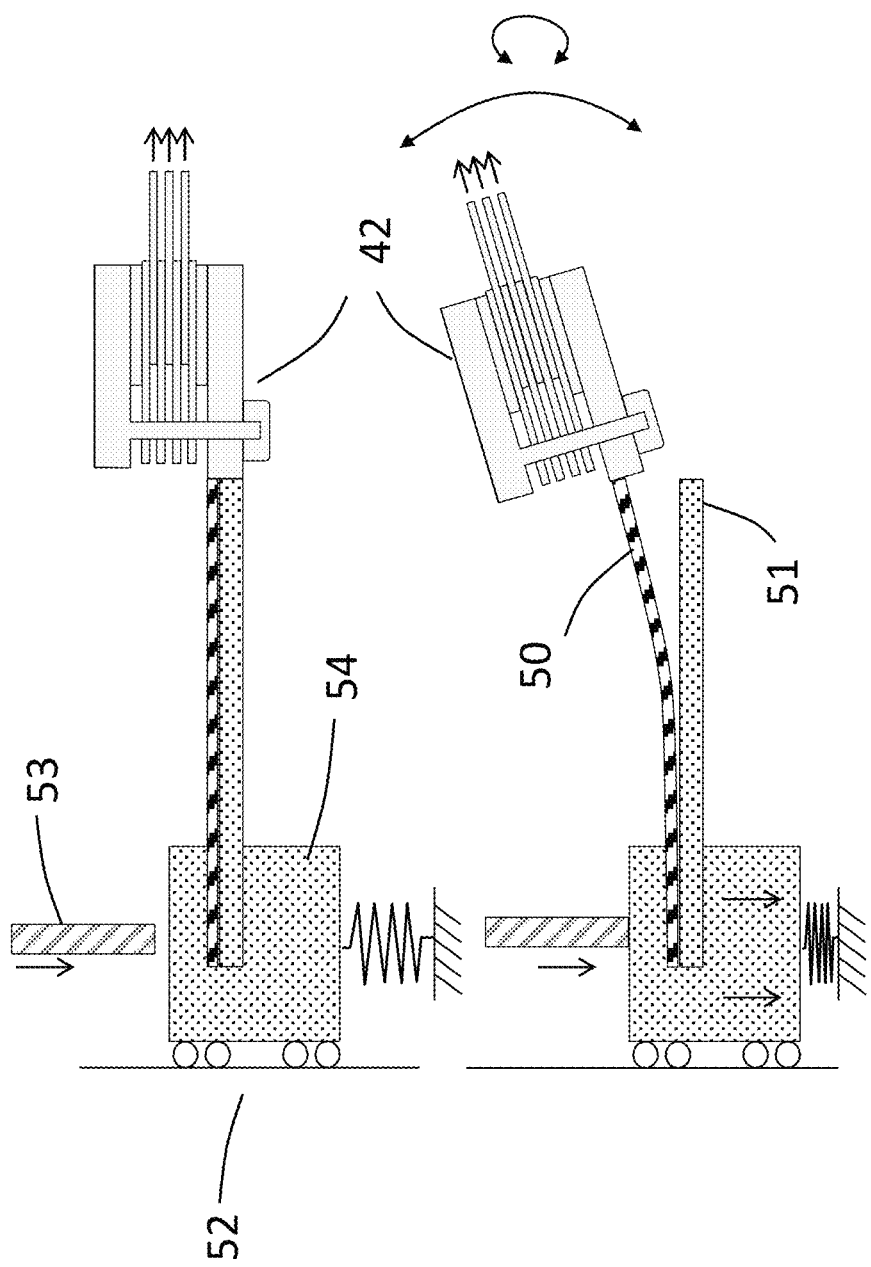
FIG. 23 shows a cross sectional view of a securing and guiding apparatus for elements of the fibre securing system.

FIG. 23 shows a cross sectional view of a securing and guiding apparatus for the elements (42) of the securing system (5) for fibres (4), as described in claim 27. This system comprises a movement mechanism (52) that can be actuated by means of a robotic system, or pushed by an actuator (53) solidly joined to the matrix (1), and that enables the securing element (42) to be positioned in the suitable place during the adaptation. For this, there is a flexible arm (50) that is anchored at one end to the mobile element (54) of the movement mechanism (52), the other end being anchored to the fibre securing element (42). This arm can be deformed for flexing and twisting, enabling the securing element (42) to align freely with the direction of stress of the fibres, which is essential to prevent the layers of fibres (13) from adhering to each other before having correctly adapted to the shape of the mould (3). Since the arm is flexible, prior to adaptation, wherein the fibres are arranged in a two-dimensional plane, the securing elements (42) could fall by their own weight. To avoid this, a rigid support (51) located under the flexible arm (50) is inserted which is anchored to the mobile element (54) of the movement mechanism (52).

FIGS. 24.A and 24.B show possible embodiments of the coupling system linked to the fibre securing system (5), according to claim 1. Cross sectional views of a securing element (42) of said securing system (5) are represented.

FIG. 24.A shows a mixed embodiment of the coupling system between the lower frame (29), separation sheets (30) and upper frame (31), wherein the lower and upper frame (29,31) are linked by means of a first hinge mechanism (55) that enables a relative rotational movement, while the separation sheets (30) are linked to the lower frame (29) by means of a pin (33) that passes therethrough. The closure system is not represented in this figure, and it can be a rotary actuator acting on the first hinge mechanism (55) exerting the necessary force to compress the fibres (13) between the lower and upper frames (29,31).

FIG. 24. B shows a coupling system made up of a first hinge mechanism (55) that joins the upper and lower frames (31,29) on one side, and second hinge mechanisms (55') that link the separation sheets (30) with the lower frame (29) on the other side. The closure system is not represented in this figure either.

INDUSTRIAL APPLICATION

Manufacture of structural composite parts that require high quality and high productivity.

The invention claimed is:

1. A machine for moulding a fibre structure to manufacture a composite material part, comprising:
   a solid matrix;
   a deformable body that is joined to the surface of said solid matrix;
   a shaping mould;
   a securing system for the fibre structure;
   wherein said solid matrix is a solid element configured to move towards the shaping mould by using a linear guide system actuated by an actuator and has a functional face facing the composite material part; wherein the deformable body is joined to the functional face of the solid matrix and is located between said shaping mould and the solid matrix;
   said deformable body is made of a material that has a rigidity at least 100 times lower than the solid matrix and the shaping mould; wherein the deformable body has an initial geometry that is changed during compression of said deformable body against said shaping mould causing the fibre structure to adapt to the geometry of the shaping mould and form the composite material part;
   said securing system comprises at least one securing element that is configured to move as the adaptation of the fibre structure adapts to the shaping mould; wherein each securing element comprises:
   a lower frame which covers an area greater than or equal to an effective securing area; wherein said lower frame includes an anchoring system comprising a tool or robotic element that enables the securing element to move during adaptation of the fibre structure to the shaping mould;
   separation sheets, which cover at least the effective securing area, wherein one of the separation sheets is located on said lower frame; wherein planes of said separation sheets and a plane of said lower frame are parallel and individual layers that form a portion of the fibre structure are between said separation sheets so that each individual layer that forms the portion of the fibre structure is always separated from each adjacent individual layer by one of said separation sheets;
   an upper closure frame, which covers at least the effective securing area, located on another one of the separation sheets; wherein a plane of said upper frame and the planes of the separation sheets are parallel; wherein said separation sheets are located between the lower frame and the upper frame; and wherein the upper frame includes an anchoring system anchored to the tool or robotic element;
   a coupling system, which links the lower frame, separation sheets, and upper frame and is configured to prevent relative displacement of the lower frame, separation sheets, and upper frame in the planes in which the lower frame, separation sheets, and upper frame are located;
   a closure system, which prevents relative displacement between the lower frame, the separation sheets, and the upper frame in a direction normal to the planes in which the lower frame, separation sheets, and upper frame are located; wherein said closure system is configured to exert a closing force between the lower frame and upper frame.

2. The machine for moulding the fibre structure to a manufacture the composite material part according to claim 1, further comprising:
   an elastic film which is configured to be placed between the deformable body and the fibre structure,
   wherein the deformable body is a material of high plasticity, has an elongation at break of less than 20%, and is permanently plastically deformed during adaptation of the fibre structure to the shaping mould.

3. The machine for moulding the fibre structure to manufacture the composite material part according to claim 2, wherein the elastic film is fastened to the solid matrix or the shaping mould; or the elastic film is secured in a fastening system fastened either to the lower frame or to the upper frame.

4. The machine for moulding the fibre structure to manufacture the composite material part according to claim 2, further comprising:
   an additional mould configured to return the deformable body to the initial shape thereof by pressing the additional mould on said deformable body against the solid matrix.

5. The machine for moulding the fibre structure to manufacture the composite material part according to claim 4, wherein the additional mould and the shaping mould include movement systems that are configured to enable both moulds to be alternately positioned in alignment with the solid matrix.

6. The machine for moulding the fibre structure to manufacture the composite material part according to claim 4, wherein the solid matrix includes a movement system comprising a robotic mechanism configured to transfer said solid matrix to a position wherein the additional mould is located.

7. The machine for moulding the fibre structure to manufacture the composite material part according to claim 4, further comprising:
   a film of elastic material having a porous body or a body having perforations enabling air evacuation, wherein said film of elastic material is secured by a film fastening system that does not invade the space of said additional mould.

8. The machine for moulding the fibre structure to manufacture the composite material part according to claim 7, wherein the film fastening system is joined to the additional mould or to the solid matrix.

9. The machine for moulding the fibre structure to manufacture the composite material part according to claim 7, wherein a contact surface of the additional mould has grooves or pores for evacuating air enclosed between the film of elastic material and said additional mould.

10. The machine for moulding the fibre structure to manufacture the composite material part according to claim 4, further comprising:
an elastic gasket including an elastic material with an elongation at break of greater than 100%; wherein said elastic gasket is configured to contain cavities or reinforcements therein, wherein said elastic gasket is either located in a contour of the additional mould or the elastic gasket is joined to the solid matrix along a contour thereof; and when the elastic gasket is joined to the solid matrix, said elastic gasket has a skirt extending towards an interior space enclosed between said solid matrix and the deformable body.

11. The machine for moulding the fibre structure to manufacture the composite material part according to claim 1, wherein the deformable body includes a series of watertight cavities filled with a fluid that is either a gas or a liquid; wherein the deformable body is an elastic body having an elongation at break of greater than 100% and does not undergo permanent deformations during the adaptation of the fibre structure to the shaping mould.

12. The machine for moulding the fibre structure to manufacture the composite material part according to claim 1, wherein the deformable body includes a series of watertight cavities filled with a fluid that is either a gas or a liquid; wherein said watertight cavities are connected to a fluid injection and evacuation system configured to vary the volume of the deformable body and to vary the degree of compression of the deformable body on the fibre structure against the shaping mould; and wherein the deformable body is an elastic body having an elongation at break of greater than 100% and does not undergo permanent deformations during the adaptation of the fibre structure to the shaping mould.

13. The machine for moulding the fibre structure to manufacture the composite material part according to claim 1 wherein the separation sheets comprise a non-stick material, or a flexible material coated with said non-stick material.

14. The machine for moulding the fibre structure to manufacture the composite material part according to claim 1, wherein the coupling system comprises at least one coupling element that is either a cylindrical pin or a threaded rod; and
wherein said coupling element is joined to either the upper frame or the lower frame; said coupling element being arranged in a direction perpendicular to the planes of the lower frame, separation sheets, and upper frame and said coupling element passing through holes included in said lower frame, separation sheets, and upper frame.

15. The machine for moulding the fibre structure to manufacture the composite material part according to claim 1, wherein the solid matrix is formed by several mobile parts that are configured to move towards the shaping mould; and
wherein said mobile parts compress the deformable material against the shaping mould.

* * * * *